(12) United States Patent
Saunamäki

(10) Patent No.: US 10,420,175 B2
(45) Date of Patent: Sep. 17, 2019

(54) WIRELESS WARMERS

(71) Applicant: Intel Corporation, Santa Clara, CA (US)

(72) Inventor: Esa Ilmari Saunamäki, Virrat (FI)

(73) Assignee: Intel Corporation, Santa Clara, CA (US)

( * ) Notice: Subject to any disclaimer, the term of this patent is extended or adjusted under 35 U.S.C. 154(b) by 843 days.

(21) Appl. No.: 14/865,098

(22) Filed: Sep. 25, 2015

(65) Prior Publication Data

US 2017/0094727 A1    Mar. 30, 2017

(51) Int. Cl.

| | | |
|---|---|---|
| H05B 1/02 | (2006.01) |
| H05B 3/54 | (2006.01) |
| A41D 13/005 | (2006.01) |
| H05B 6/06 | (2006.01) |
| H05B 6/10 | (2006.01) |
| H02J 5/00 | (2016.01) |
| H05B 3/34 | (2006.01) |
| H04B 5/00 | (2006.01) |
| H02J 50/12 | (2016.01) |
| H02J 50/80 | (2016.01) |

(52) U.S. Cl.
CPC .......... *H05B 6/10* (2013.01); *A41D 13/0051* (2013.01); *H02J 5/005* (2013.01); *H02J 50/12* (2016.02); *H04B 5/0037* (2013.01); *H05B 3/347* (2013.01); *A41D 2400/10* (2013.01); *A41D 2400/12* (2013.01); *H02J 50/80* (2016.02)

(58) Field of Classification Search
None
See application file for complete search history.

(56) References Cited

U.S. PATENT DOCUMENTS

| | | |
|---|---|---|
| 4,278,941 A | 7/1981 | Freedman |
| 4,662,001 A | 4/1987 | Cruz et al. |
| 5,157,362 A | 10/1992 | Zelenz |
| 5,565,756 A | 10/1996 | Urbish et al. |
| 5,596,567 A | 1/1997 | deMuro et al. |
| 5,805,067 A | 9/1998 | Bradley et al. |
| 5,963,012 A | 10/1999 | Garcia et al. |
| 6,002,237 A | 12/1999 | Gaza |
| 6,020,783 A | 2/2000 | Coppola |

(Continued)

FOREIGN PATENT DOCUMENTS

| | | |
|---|---|---|
| FR | 2868542 A1 | 10/2005 |
| GB | 2413458 A | 10/2005 |

(Continued)

OTHER PUBLICATIONS

International Search Report dated Mar. 8, 2011 in International Application No. PCT/FI2010/050877, 5 pages.

(Continued)

*Primary Examiner* — Joseph M Pelham
(74) *Attorney, Agent, or Firm* — Spectrum IP Law Group LLC

(57) ABSTRACT

Methods and apparatus relating to wireless warmers are described. An embodiment integrates wireless warming into an article of clothing. For example, the article of clothing includes a heating element to receive electromagnetic energy from one or more wireless power transmitter coils based at least in part on one or more signals. Other embodiments are also disclosed and claimed.

24 Claims, 17 Drawing Sheets

(56) References Cited

U.S. PATENT DOCUMENTS

| | | | |
|---|---|---|---|
| 6,054,927 A | 4/2000 | Brickell | |
| 6,242,888 B1 | 6/2001 | Cerf | |
| 6,501,246 B2 | 12/2002 | You et al. | |
| 6,617,827 B2 | 9/2003 | Knish et al. | |
| 6,657,170 B2* | 12/2003 | Clothier | A47C 1/12 126/400 |
| 6,792,297 B2 | 9/2004 | Cannon et al. | |
| 6,828,759 B1 | 12/2004 | Xiong et al. | |
| 6,953,919 B2* | 10/2005 | Clothier | H05B 6/062 219/494 |
| 6,977,479 B2 | 12/2005 | Hsu | |
| 7,180,265 B2 | 2/2007 | Naskali et al. | |
| 7,199,554 B2 | 4/2007 | Kim et al. | |
| 7,202,634 B2 | 4/2007 | Bucur | |
| 7,205,747 B2 | 4/2007 | Wu | |
| 7,288,918 B2* | 10/2007 | DiStefano | H02J 50/20 320/108 |
| 8,427,101 B2 | 4/2013 | Saunamaki | |
| 8,655,272 B2 | 2/2014 | Saunamaki | |
| 2002/0028699 A1 | 3/2002 | Moquin et al. | |
| 2002/0089305 A1 | 7/2002 | Park et al. | |
| 2003/0231001 A1 | 12/2003 | Bruning | |
| 2004/0203478 A1 | 10/2004 | Scott | |
| 2004/0221183 A1 | 11/2004 | Lu | |
| 2005/0001595 A1 | 1/2005 | May et al. | |
| 2006/0202665 A1 | 9/2006 | Hsu | |
| 2006/0280948 A1* | 12/2006 | Moreshead | B32B 5/024 428/411.1 |
| 2007/0145830 A1 | 6/2007 | Lee et al. | |
| 2007/0199137 A1* | 8/2007 | Numes Ramos De Carvalho | A41D 1/002 2/458 |
| 2007/0229279 A1 | 10/2007 | Yamazaki et al. | |
| 2007/0267398 A1* | 11/2007 | McCoy | A43B 7/025 219/211 |
| 2007/0276270 A1* | 11/2007 | Tran | A61B 5/0022 600/508 |
| 2007/0279002 A1 | 12/2007 | Partovi | |
| 2008/0034528 A1* | 2/2008 | Bourke | B60S 1/3805 15/250.06 |
| 2008/0058742 A1* | 3/2008 | Ales | A61F 13/42 604/361 |
| 2008/0109941 A1* | 5/2008 | Moreshead | B32B 7/02 2/243.1 |
| 2008/0197126 A1* | 8/2008 | Bourke | A43B 7/025 219/634 |
| 2008/0220831 A1 | 9/2008 | Alameh et al. | |
| 2008/0238364 A1 | 10/2008 | Weber et al. | |
| 2008/0303479 A1 | 12/2008 | Park et al. | |
| 2009/0157145 A1 | 6/2009 | Cauller | |
| 2009/0179502 A1 | 7/2009 | Cook et al. | |
| 2009/0284082 A1 | 11/2009 | Mohammadian | |
| 2010/0007307 A1 | 1/2010 | Baarman et al. | |
| 2010/0036773 A1 | 2/2010 | Bennett | |
| 2010/0190435 A1 | 7/2010 | Cook et al. | |
| 2010/0222010 A1 | 9/2010 | Ozaki et al. | |
| 2011/0009057 A1 | 1/2011 | Saunamaki | |
| 2011/0057606 A1 | 3/2011 | Saunamaki, et al. | |
| 2011/0115430 A1 | 5/2011 | Saunamaki | |
| 2011/0127248 A1* | 6/2011 | Moreshead | D03D 1/0076 219/209 |
| 2011/0215086 A1* | 9/2011 | Yeh | F21V 23/02 219/488 |
| 2011/0220634 A1* | 9/2011 | Yeh | A43B 3/0005 219/482 |
| 2015/0267944 A1* | 9/2015 | Duwel | F25B 21/00 62/3.1 |
| 2016/0113064 A1* | 4/2016 | Gluckman | A41D 19/0024 219/211 |
| 2016/0178251 A1* | 6/2016 | Johnson | A61F 7/007 62/3.5 |
| 2017/0172331 A1* | 6/2017 | Publicover | A63B 5/11 |
| 2017/0209301 A1* | 7/2017 | DeSeve | A61F 7/007 |
| 2017/0244262 A1* | 8/2017 | Schadow | A41D 13/0002 |
| 2017/0245679 A1* | 8/2017 | Watts | A47J 36/24 |
| 2018/0169994 A1* | 6/2018 | Burwell | F16L 59/029 |

FOREIGN PATENT DOCUMENTS

| | | |
|---|---|---|
| WO | 03105311 A1 | 12/2003 |
| WO | 2006001557 A1 | 1/2006 |
| WO | 2008145982 A2 | 12/2008 |
| WO | 2009037380 A1 | 3/2009 |

OTHER PUBLICATIONS

International Search Report for International Application No. PCT/IB2010/053958 dated Jan. 14, 2011.
Office Action received for U.S. Appl. No. 12/498,872, dated Mar. 19, 2012, 17 pages.
Office Action received for U.S. Appl. No. 12/498,872, dated Oct. 21, 2011, 17 pages.
International Search Report dated Jul. 7, 2009 for International Application No. PCT/FI2010/050431.
Notice of Allowance received for U.S. Appl. No. 12/498,872, dated Oct. 15, 2013, 9 pages.
Office Action received for U.S. Appl. No. 12/554,468, dated Sep. 4, 2009, 9 pages.
Notice of Allowance received for U.S. Appl. No. 12/620,861, dated Feb. 20, 2013, 5 pages.
Office Action received for U.S. Appl. No. 12/620,861, dated Jan. 11, 2013, 13 pages.
Office Action received for U.S. Appl. No. 12/620,861, dated Mar. 15, 2012, 11 pages.

* cited by examiner

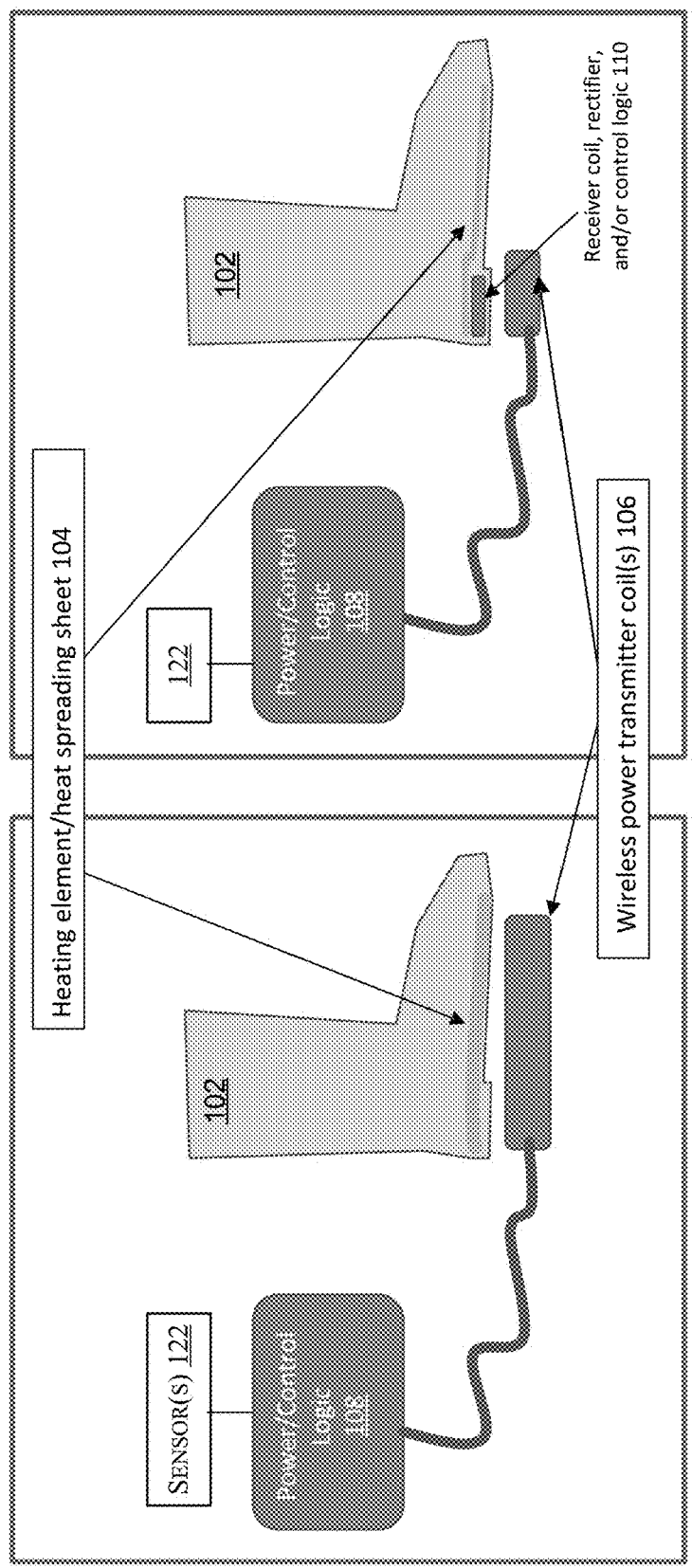

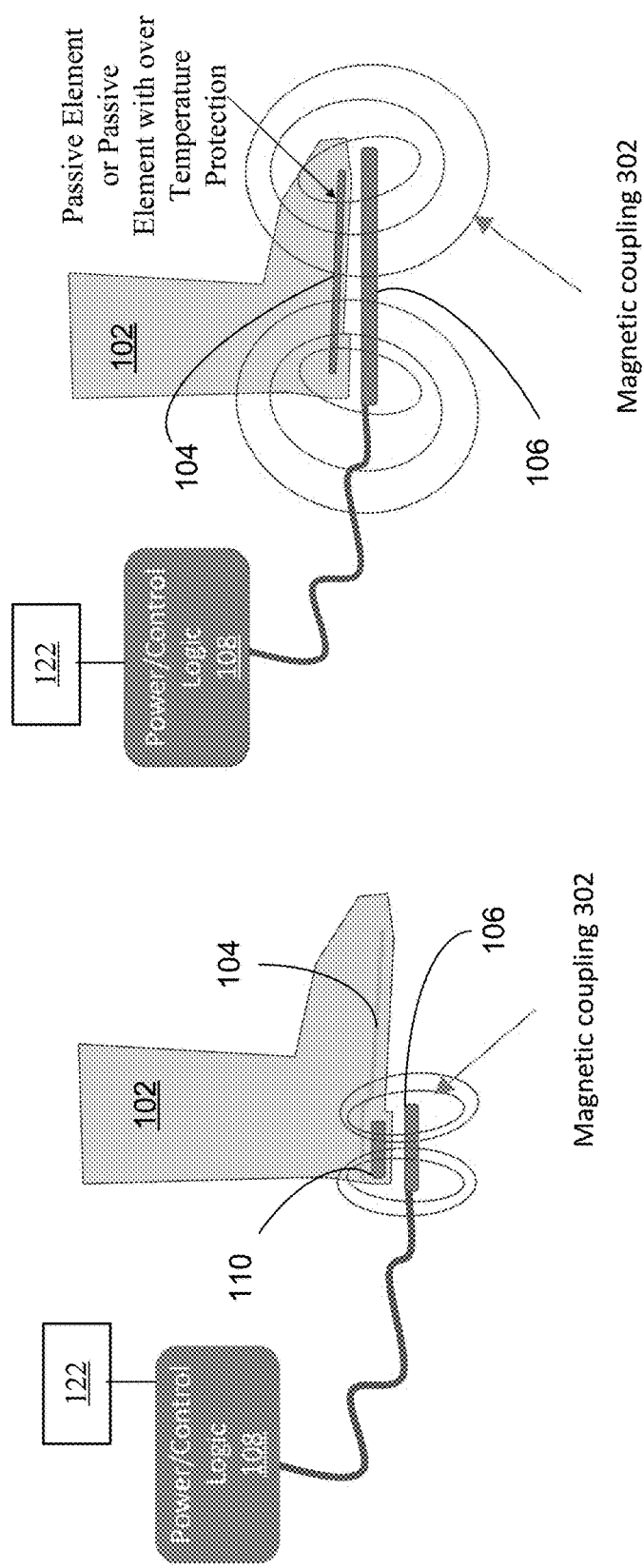

back of the hand

104/110
Receiver coil, rectifier, control circuits and heating element

TX coil as part of the handlebar grip structure to support heating of the gloves

106/108

WIRELESS WARMERS

FIELD

The present disclosure generally relates to the field of electronics. More particularly, an embodiment relates to techniques for wireless warmers.

BACKGROUND

Severe weather can significantly curtail outdoor activity. For example, as outdoor temperatures drop, the level of outdoor activity generally becomes limited by how much or how well a person is dressed.

One solution to support outdoor activity for a longer period is to utilize a warmer. Such warmers may operate based on a chemical reaction. However, chemical warmers can be expensive to use, or may be limited in their effective duration. Also, chemical warmers may generate more waste as their material may not be reusable or environmentally sound. Another solution is to use a battery operated warmer. However, such warmers may be too complicated to recharge via a wired connection.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 1A, 1B, 2A, 2B, 3, 4A, 4B, 4C, and 6-13 illustrate diagrams of various wireless warming systems, according to some embodiments.

DETAILED DESCRIPTION

Figures 2A, 2B:
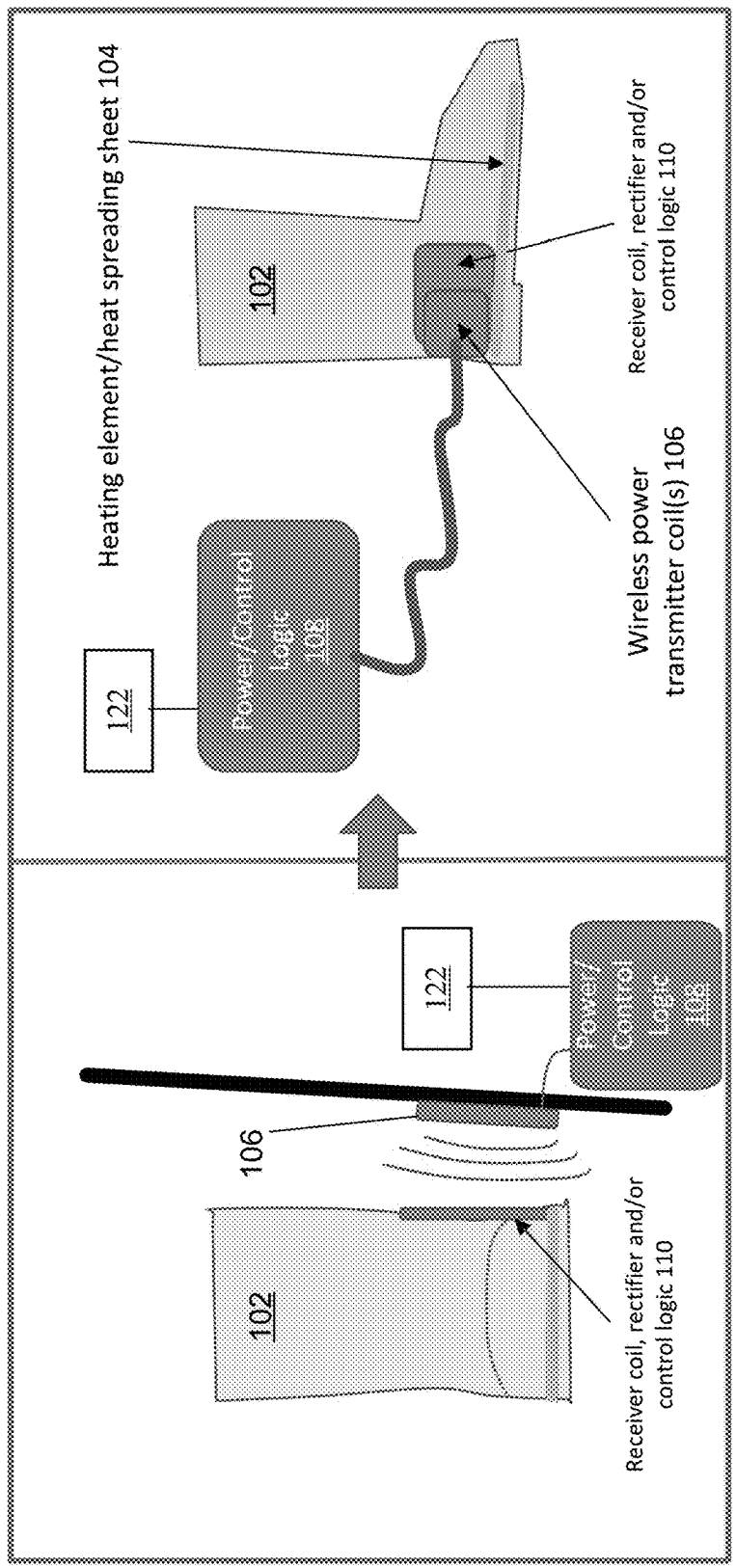

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As discussed above, battery operated warmers may be too complicated to recharge, e.g., after a few hours of use. Furthermore, a battery's storage level is generally directly correlated with its weight. As such, to provide a battery for a warmer that lasts longer (or can heat more effectively or quickly), heavier batteries generally need to be used. A heavier battery in turn may have a negative effect on outdoor activities, e.g., due to the extra weight or physical integration issues. Also, to charge the battery, a charger (whether external or internal to the system) may have to be used, which will add additional weight to the system. Moreover, an external charger will be more cumbersome to use and carry around.

Some embodiments provide techniques for provision of wireless warmers. An embodiment integrates wireless charging technology into an article of clothing (such as a shoe, a boot, a hat, a helmet, a sock, a glove, an ear muff, a shirt, a jacket, a scarf, a pair of pants, underwear, body protector (such as chest protector, e.g., while riding a bicycle or motorcycle), a safety vest (such as a vest worn by workers, bicyclists or motorcyclists, or a vest used for marine applications such as boating, sailing, fishing, or the like) etc.), which generally improves usability compared to some wired battery-based systems.

For example, a warmer may be applied in any article of clothing when a user is in a location (such as at a ski resort, at a bus stop, in a car, in a van, on a bus, on a plane, in a hospital, etc.). The user may be in various positions such as sitting, standing up (e.g., against a wall or on a platform waiting for something), leaning (e.g., against an object or wall), etc. In another embodiment, logic (e.g., integrated in an article of clothing such as those mentioned above) may be used to provide multi-factor authentication, e.g., to unlock/lock an item (such as a lock) or make an item accessible/operational (such as a bicycle, a motorcycle, a car, a bus, a house, an office, etc.).

Some embodiments add a wireless heating system in shoes and, for example, to special types of shoes such as downhill skiing boots, motorcycle boots, snowmobile boots, etc. This is shown in FIGS. 1A-4B, according to some embodiments.

For instance, in a motorcycle, snowmobile, and similar application, wireless power transmitter can be integrated into a footrest; hence, shoes/boots can be kept warm when riding and when temperatures drop below a threshold level (or otherwise operated in response to a command by the rider). In downhill skiing application, transmitter coils can be installed under a floor mat, any leg support in cafeteria or similar place in a skiing center/resort or even ski lift or gondola.

Referring to FIGS. 1A and 1B, side views of a wireless heating system for a boot 102 are shown. The boot 102 includes heating element/heat spreading sheet 104. The heating element 104 is in wireless contact with wireless power transmitter coil(s) 106. The coil(s) 106 are activated/controlled by power/control logic 108. Logic 108 may include various components including one or more of the components discussed with reference to FIGS. 14-17. The boot of FIG. 1A includes a passive heating element (as will be further discussed below, e.g., with reference to FIGS. 5A-5C), whereas the boot in FIG. 1B includes other logic 110 (such as receiver coil(s), a rectifier, and/or control logic).

Referring to FIGS. 2A and 2B, back and side views of a wireless heating system that transmits wireless energy towards one side of the boot 102 are shown, according to some embodiments. More particularly, FIG. 2A shows a back view of the boot 102 in proximity to the wireless power transmitter coil(s) 106 positioned towards one side of the boot 102. As illustrated, the systems of FIGS. 2A and 2B may also include the heating element 104, logic 108, and logic 110.

Figure 3:
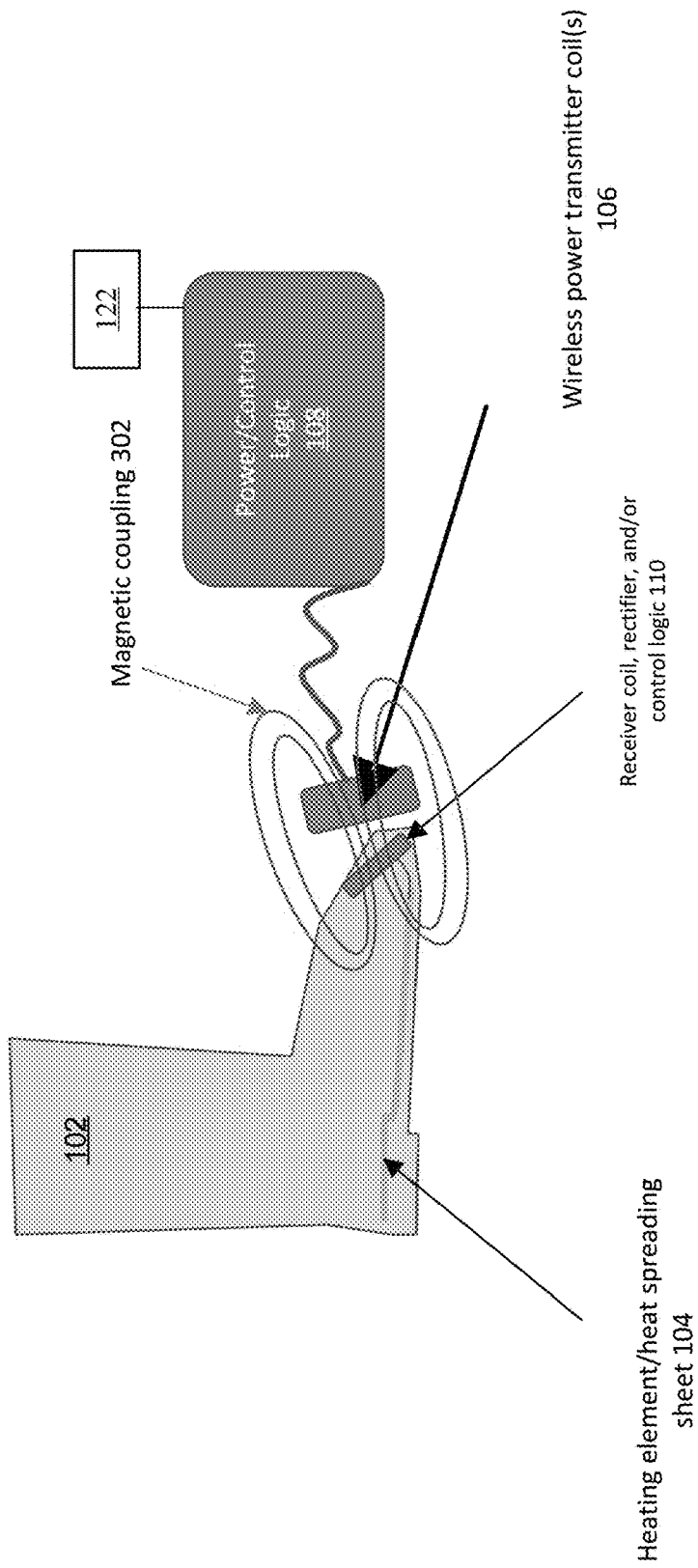

Referring to FIG. 3, a side view of a wireless heating system that transmits wireless energy towards the front of the boot 102 is shown, according to an embodiment. As illustrated, the systems of FIG. 3 may also include the heating element 104, logic 108, and logic 110. Magnetic coupling 302 is established, e.g., to maintain a distance or proximity and/or facilitate the transfer of energy between the wireless power transmitter coil(s) 106 and the receiver coil, rectifier, and/or control logic 110.

Referring to FIGS. 4A and 4B, side views of a wireless heating system that transmits wireless energy towards the underside of the boot 102 are shown, according to some embodiments. More particularly, FIGS. 4A and 4B show magnetic coupling 302 established between the heating element 104 and the coil(s) 106. As illustrated, the systems of FIGS. 4A and 4B may also include the logic 108 and 110. Moreover, the heating element 104 of FIG. 4B may be a passive element or a passive element with temperature protection, as labeled.

Furthermore, as shown in FIGS. 1A-4B, the wireless warming systems may also include sensor(s) 122 to facilitate thermal and/or performance management as discussed herein, e.g., via logic 180. For example, one or more sensor(s) 122 may be provided to detect proximity of an article of clothing (such as boot 102) to the logic 106, 108, and/or 110. The sensed proximity detection information may be used to allow or deny access to a service or item (e.g., as a factor in authentication (or as one factor in a multi-factor authentication)) as discussed herein. Also, sensor(s) 122 may detect ambient temperature and/or temperature of the article of clothing (such as boot 102) in order to determined when to apply wireless electromagnetic energy through coil(s) 106 to heat the article of clothing. In an embodiment, one or more of sensors 122 may be provided in an article of clothing (such as boot 102) to detect (and report) temperature value(s) of the article of clothing and/or heating element 104.

Figure 4C:
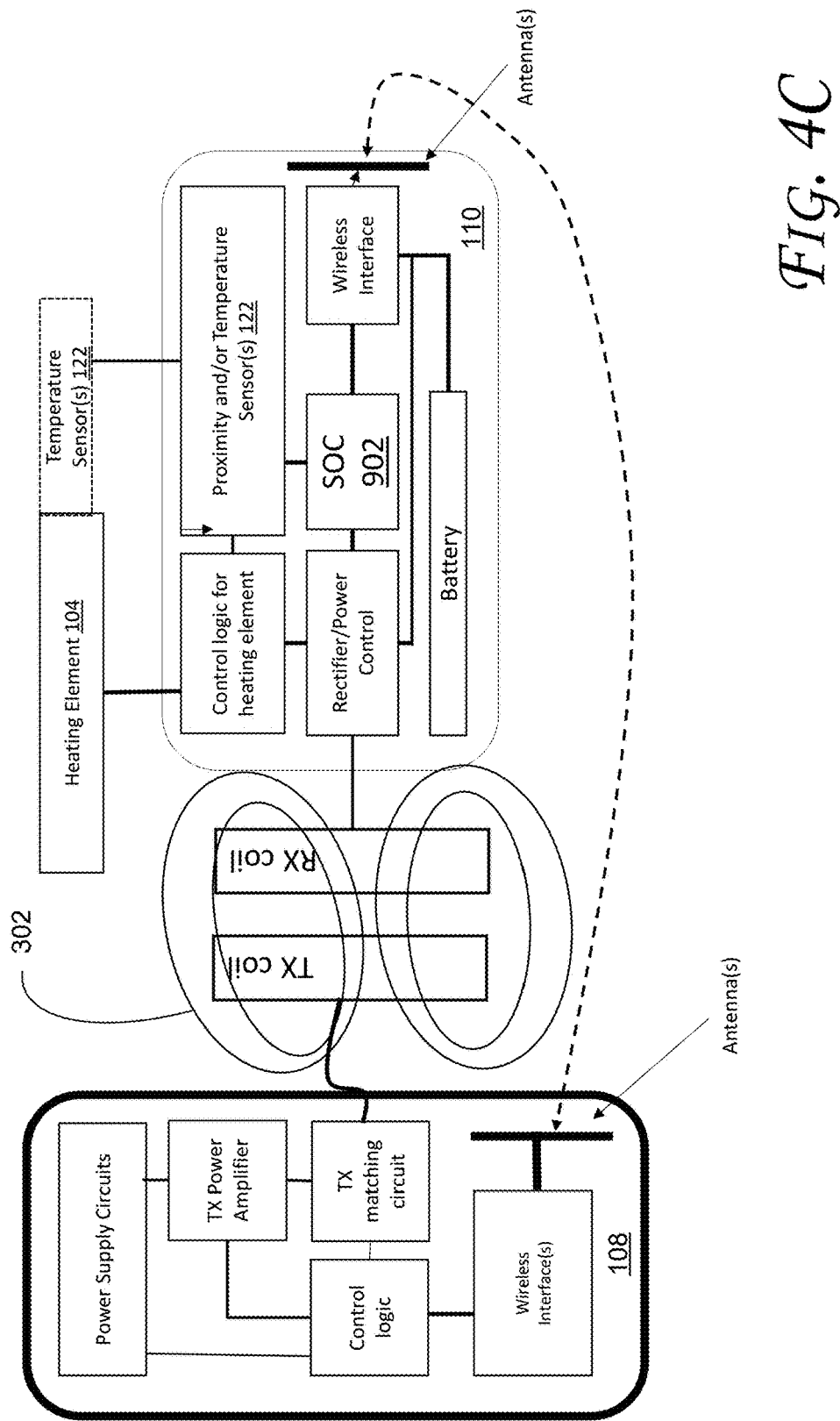

FIG. 4C illustrates a block diagram of a warming system, according to an embodiment. As shown power/control logic 108 may include power supply circuits, a transmit (TX) power amplifier, control logic (e.g., to control operations of the power transmission side of the system of FIG. 4C), a transmit matching logic (to facilitate wireless transmission of energy), one or more wireless interfaces (such as those discussed with reference to FIGS. 14-17), and antenna(s) to communicate wireless signals with the receive end. Logic 108 in turn drives the transmit coil(s) 106 which transmit energy wirelessly to the receive (RX) coil(s) 110.

As also illustrated in FIG. 4C, on the receiving side, logic 110 includes control logic for the heating element (e.g., to facilitate the operations performed on the receive side) in an article of clothing (such as those discussed herein including shoes), sensor(s) 110 (e.g., which may include a capacitive sensor, temperature/proximity sensor, or other sensors such as discussed herein), a wireless interface (such as those discussed with reference to FIGS. 14-17, to communicate wireless signals between the receive and transmit ends), an SOC (such as the SOC 902 of FIG. 9), a rectifier/power control logic, a battery (and/or a capacitor or super capacitor) to provide power to the components on the receive end when no wall outlet is accessible, and antenna(s) to communicate wireless signals with the transmit end.

For example, sensor(s) 122 may detect whether the clothing is being worn and in the case the clothing is not being worn, a higher temperature may be applied to dry up the article of clothing, without making a user uncomfortable since the clothing is not being worn. When movement of the article of clothing is detected (e.g., per input from an accelerometer embedded in the article of clothing as one of the sensors 122 in an embodiment), the applied temperature may be reduced to ensure that article of clothing is not too hot for user comfort. In an embodiment, a warning (such as a sound or message) may be directed to an end user or a designated smartphone (or other computing device) that the article of clothing might be too hot and/or suggest the end user should wait for some (e.g., given) period of time before wearing the article of clothing.

Figure 5A:
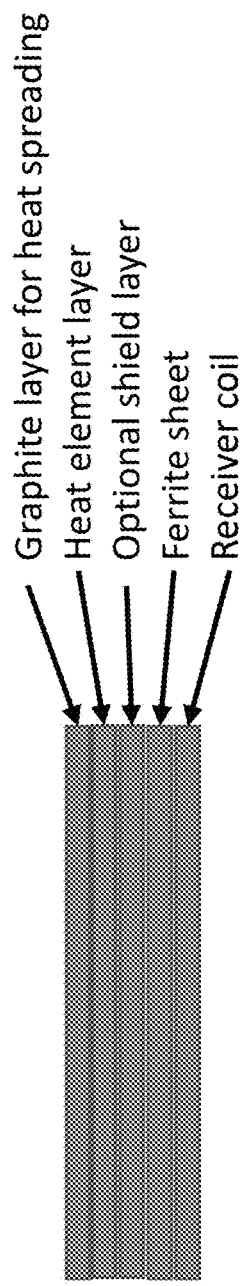
FIGS. 5A, 5B, and 5C illustrate block diagrams of various layers that may be applied in wireless heating systems, according to some embodiments.
Figure 5B:
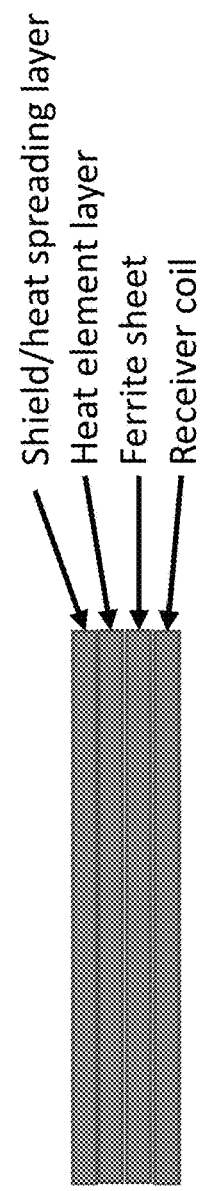
Figure 5C:

FIGS. 5A, 5B, and 5C illustrate block diagrams of various layers that may be applied in wireless heating systems, e.g., to implement item 104 discussed with reference to FIGS. 1A-4B, according to some embodiments. FIGS. 5A and 5B utilize some electrical circuits/logic, e.g., such as one or more receiver coils, rectifier, and/or control logic 110. FIG. 5C is a passive warming system where magnetic field(s) directly heat some magnetic material (e.g., one or more receiver coils 110).

As shown in FIG. 5A, the heating element 104 may include a graphite layer, a heating element layer, an optional shielding layer, a ferrite sheet, and one or more receiver coils (110). Referring to FIG. 5B, the heating element 104 may include a shield/heat spreading layer, a heating element layer, a ferrite sheet, and one or more receiver coils (110). And, as illustrated in FIG. 5C (an entirely passive heating element without other logic on the article of clothing side), the heating element 104 may include a graphite layer and a ferrite sheet. Furthermore, the layers of material discussed with reference to FIGS. 5A-5C may be fastened together by a casing surrounding the layers, stacked by using glue/adhesive, or other fasteners (e.g., soft/rigid rivets, which in an embodiment may also guide the heat element 104 into a correct position during final assembly), stitches, etc.

Accordingly, in some embodiments, a plurality of layers may be used in an article of clothing, e.g., including at least two of: a heat spreading layer (such as a graphite layer), a heating element layer, a shielding layer, a Ferrite sheet layer, a receiver coil layer, or a heating element layer with shielding properties. Furthermore, in some embodiments, the shielding layer could be magnetic resonance based (e.g., in accordance with A4WP, or The Alliance for Wireless Power, which refers to a standard developed by A4WP called Rezence™, where the system is based on magnetic resonance and use higher frequency than Qi and PMA technologies, for example) systems, e.g., including a conductive metal layer (such as sheet metal, conductive fabric, or a painted conductive layer, e.g., Copper, SUS (Steel Use Stainless or stainless), or aluminum) or other electrically conductive layer including, for example, nano-carbon or other conductive nano-material based conductive layer. In the inductive wireless charging (Qi/PMA/WPC) based systems, which use lower frequency, shield materials may have a high permeability (where the material may include Mu-metal sheet). Generally, the Rezence system includes a single Power Transmitter Unit (PTU, e.g., logic 108) and one or more Power Receiver Units (PRUs, e.g., logic 110). Also, "Qi" refers to a wireless charging system provided by WPC (Wireless Power Consortium). Qi is based on inductive coupling between the transmitter and receiver coil. "PMA" refers to Power Matters Alliance and PMA technology is based on inductive coupling as Qi.

Additionally, as discussed above, FIG. 5C may be a passive warming system where magnetic field(s) directly heat some magnetic material (e.g., one or more receiver coils 110). For example, due to magnetic losses of material stack, magnetic fields heat up this structure. In this case, there is no direct communication with power transmitter unit (e.g., coil(s) 106), but the user might have control software in smartphone (or another computing device such as those discussed herein) or possibility to control power levels directly from transmitter unit. In an embodiment, the passive heating element might include RFID (Radio Frequency Identification), NFC (Near Field Communication), or Bluetooth® functionality/technology to control the power level of the element (e.g., specified in an NFC tag). In another embodiment, heating of passive element is only started if a heating element is detected (e.g., based on NFC, RFID, Bluetooth, or other technologies). In some embodiments, the passive structure may also include one or more coils, which may be tuned to resonance at a (e.g., selected) frequency so that PTU (e.g., logic 108) can start power delivery based on a determination that receiver coil resonance is visible for transmitter coil. In an embodiment, instead of the layered structure (e.g., discussed with reference to FIGS. 5A-5C), a passive structure may be implemented as a combination/mixture of one or more of: ferromagnetic (or other RF lossy materials), nano material, material targeted for heat spread or shielding, e.g., mixed as a powder, paste, or similar mixture for articles of clothing such as those discussed herein. For example, a combination/mixture of plastic, nylon, wood based powder/fiber, rubber etc. can be extruded into a cavity of a shoe or body protector. In some fabric based applications, the above-mentioned passive structure or mixture may be provided via a printed surface in an embodiment. In one embodiment, e.g., the passive structure including even one or more resonating coils structure can be printed. It is also possible to provide a structure so that one or more of receiver coils are located in a difference location than one or more heating elements.

As discussed herein, in some embodiments, components in an article of clothing (such as boot 102) might include an accelerometer, a humidity sensor, a carbon monoxide sensor, a pulse sensor, and/or similar sensor(s) to improve movement/driving/riding safety. For example, statistical data may be collected from the sensors 122, e.g., including G-forces, speed, leg angle etc. to allow for the possibility of analysis. In one example, downhill skiing experience and/or technique may be analyzed, and the analysis may be shared or used as part of a game, training, or other application(s). The article of clothing may also have active communication with logic coupled to or within an item (e.g., a bicycle, a motorcycle, a car, a bus, house, office, etc.) to gain access to the item. For example, the engine of a vehicle may be started only when correct shoes/boots are close enough to the vehicle. Also, a (e.g., small or lightweight) battery (or capacitor or super capacitor) can be used in the article of clothing to provide reserve power for activity, safety features, operations, and/or logic.

In one embodiment, a sensor hub is provided in the article or clothing (or otherwise coupled to the article of clothing) to allow an end user the option of connecting additional sensors (e.g., sensors 122). For example, a shoe could include a mechanical slot, where the user can select different sensor modules or the end user may place an NFC payment module (or other form of wireless payment), e.g., to pay for services such as ski resort or coffee house services.

In some embodiments, the control logic for heating system, may include processor(s), sensor hubs, audio circuits, display, physical control interface, memory parts and other peripherals/accessories to allow signal processing, state indication and logical controls, such as discussed with reference to FIGS. 14-17. It may also include one or more wireless interfaces to communicate with power transmitter unit, smartphones, tablets, laptops, bracelets, wearables, other wireless accessories and payment units, such as discussed with reference to FIGS. 14-17.

Figure 6:
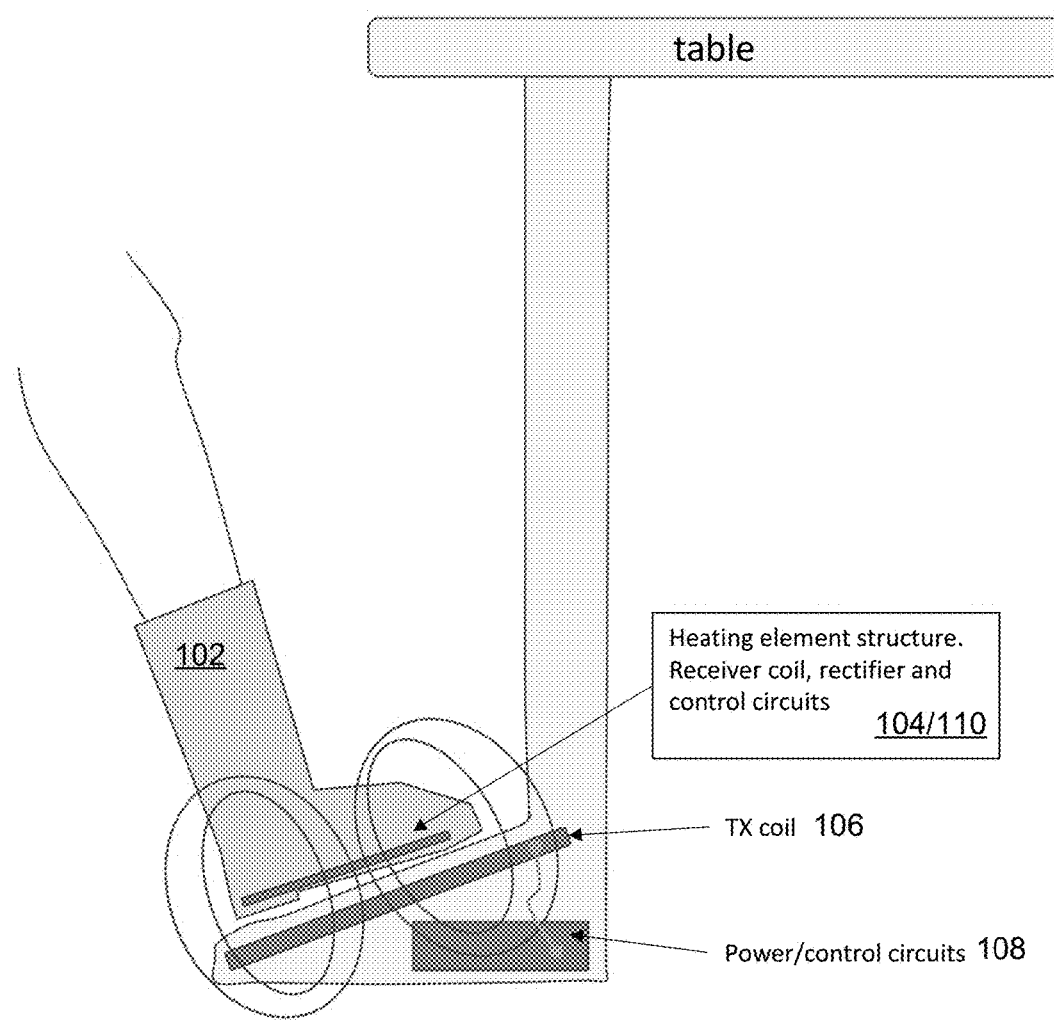

FIG. 6 illustrates an embodiment of a boot warming system, according to an embodiment. As shown in FIG. 6, the power/control circuits 108 may be incorporated into the base of a stationary table. The table/desk may be provided in various environments, e.g., at a lodge/hotel/resort, office, customer counter (e.g., at a coffee shop or other food facility, etc.), etc.

Figure 7:
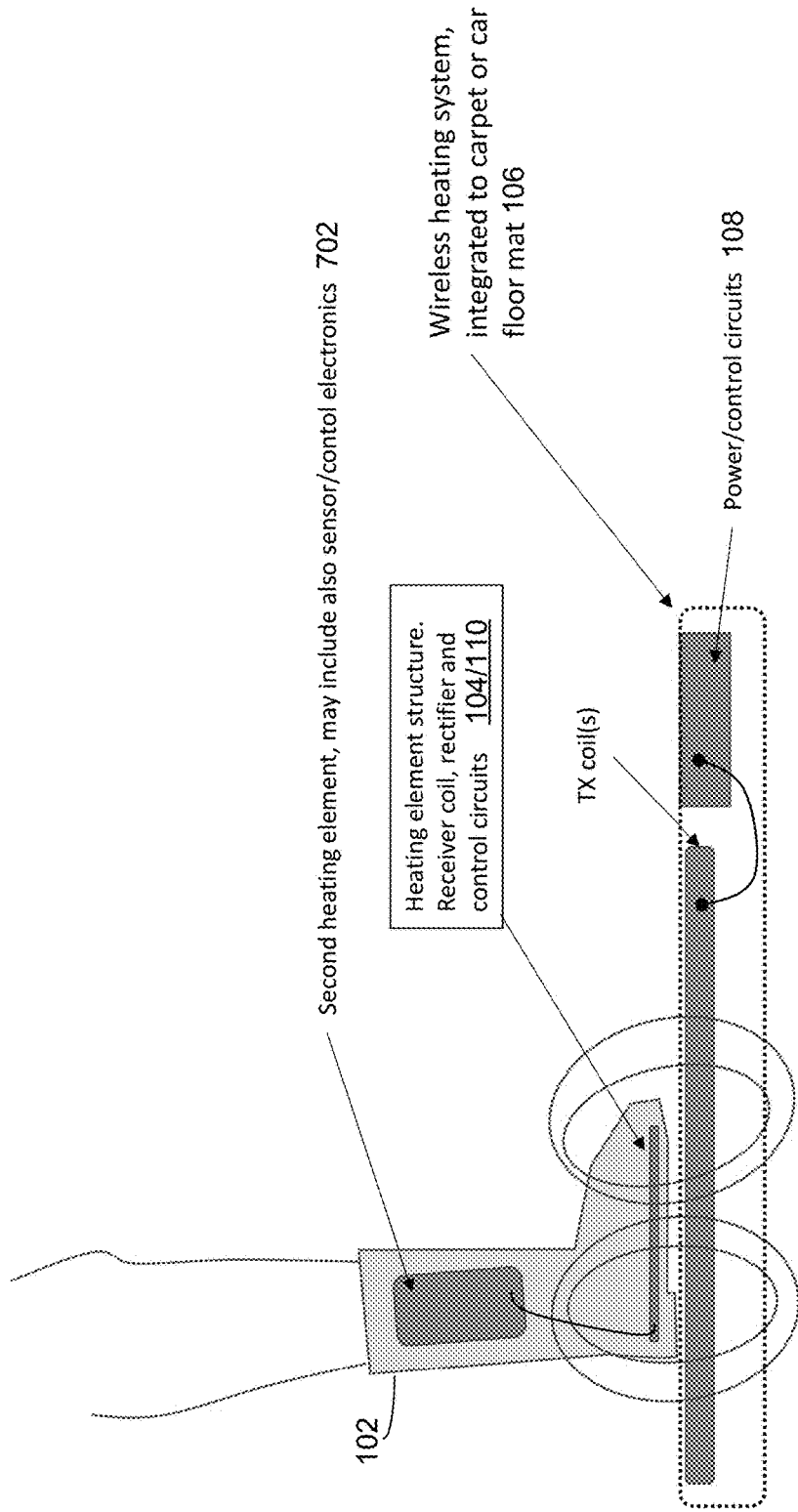

FIG. 7 illustrates an embodiment of a boot warming system, according to an embodiment. As shown in FIG. 7, the power/control circuits 108 may be incorporated into carpet or flooring (e.g., car/bus/truck floor mat, a waiting area, an elevator, etc.). In an embodiment, a second heating element 702 may be used (e.g., as shown in the boot 102 of FIG. 7, and not shown in other figures explicitly for the sake of simplicity), which may be integrated with one or more sensors and/or control electronics (e.g., logic 110 discussed with reference to other figures).

Figure 8:
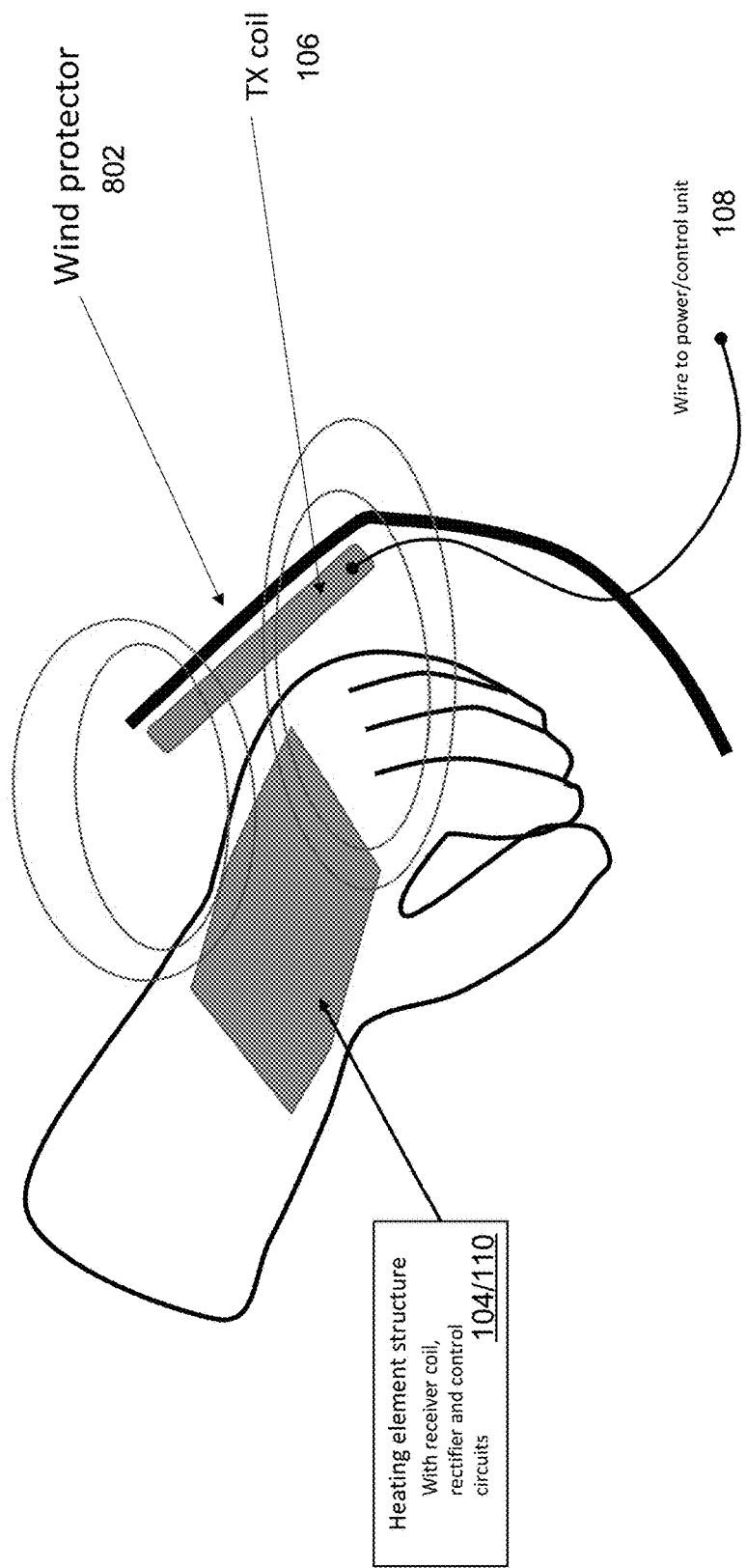

FIG. 8 illustrates an embodiment of a glove (such as those discussed herein, such as a ski glove, a motorcycle/snowmobile/bicycle glove, etc.) with an integrated heating element structure 104/110. A wind protector 802 may also be provided in proximity to the glove to facilitate a more efficient heating by limiting negative environmental elements such as wind.

Figure 9:
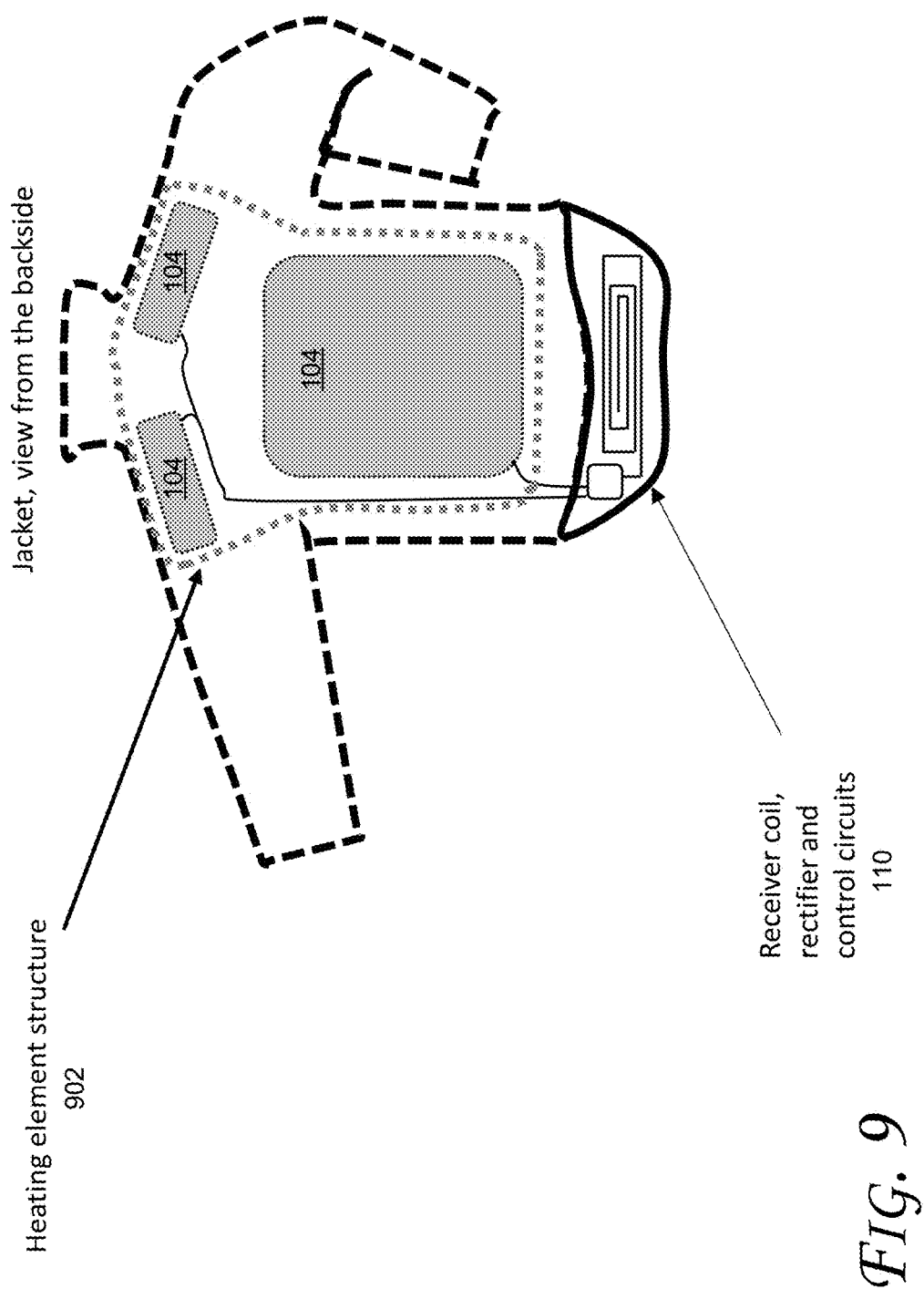

FIG. 9 illustrates an embodiment of a jacket (such as those discussed herein, such as a ski jacket, a motorcycle/snowmobile/bicycle jacket, etc.) with an integrated heating element structure 104/110. FIG. 9 shows the backside view of the jacket with a heating element structure 902 may be implemented (e.g., within which one or more of the heating element/heat spreading sheets 104 may be provided). While the structure 902 is shown to cover certain areas in the jacket, heating element/heat spreading sheet 104 may be provided in locations other than those illustrate in the example of FIG. 9, such as in the sleeves, around the jacket collar, etc.

Figure 10:
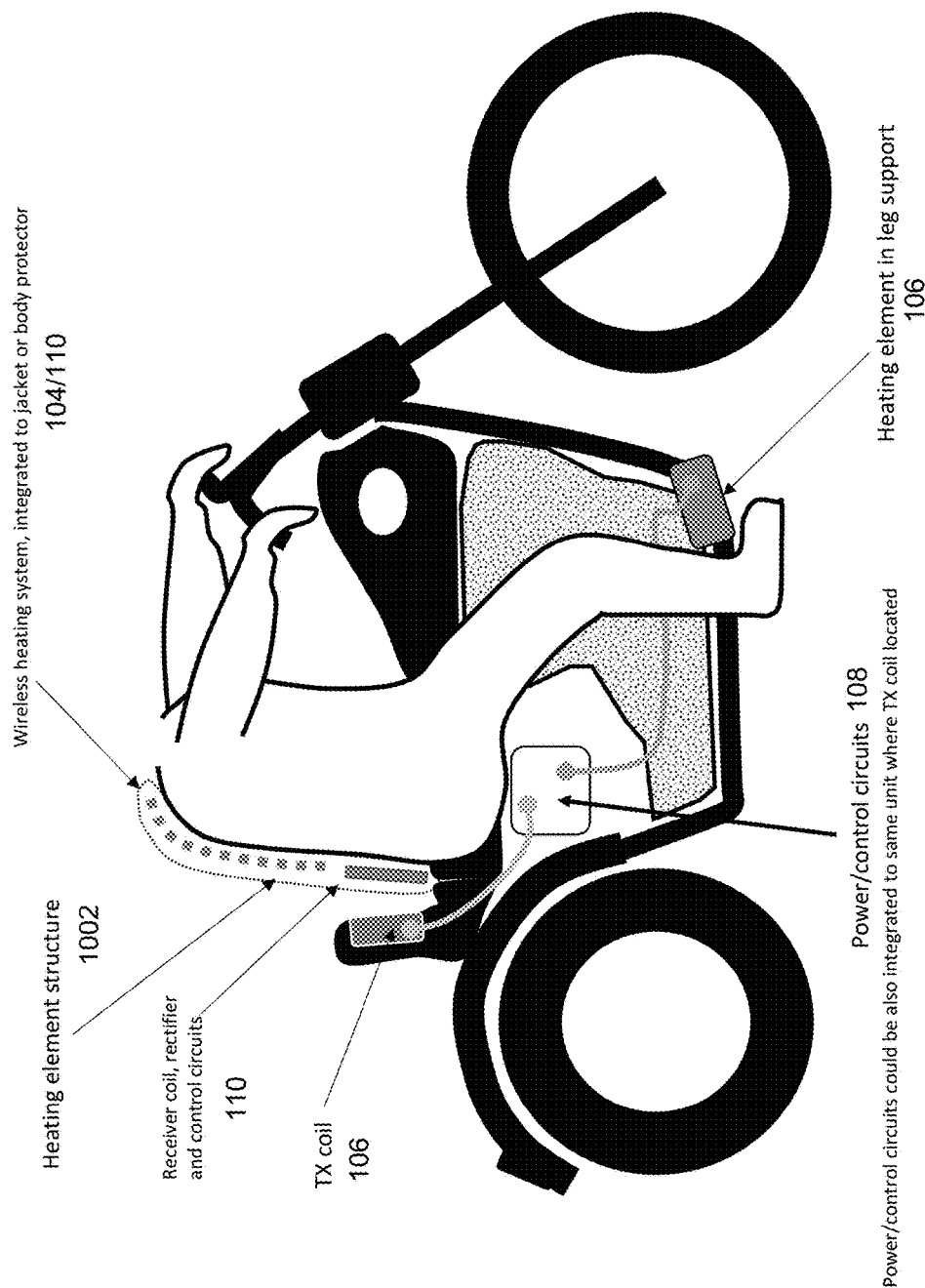

FIG. 10 illustrates an embodiment of a motorcycle (which may also be applicable in a snowmobile, a bicycle, etc.) with an integrated heating element structure 104/110. FIG. 10 shows how a heating element structure 1002 may be implemented that is proximate to a rider's body (e.g., within which one or more of the heating element/heat spreading sheets 104 may be provided). As shown in FIG. 10, the illustrated embodiment may also include a heating element 106 in the foot/leg support area (e.g., to provide an integrated shoe/boot warmer such as discussed with reference to the other figures).

Figure 11:
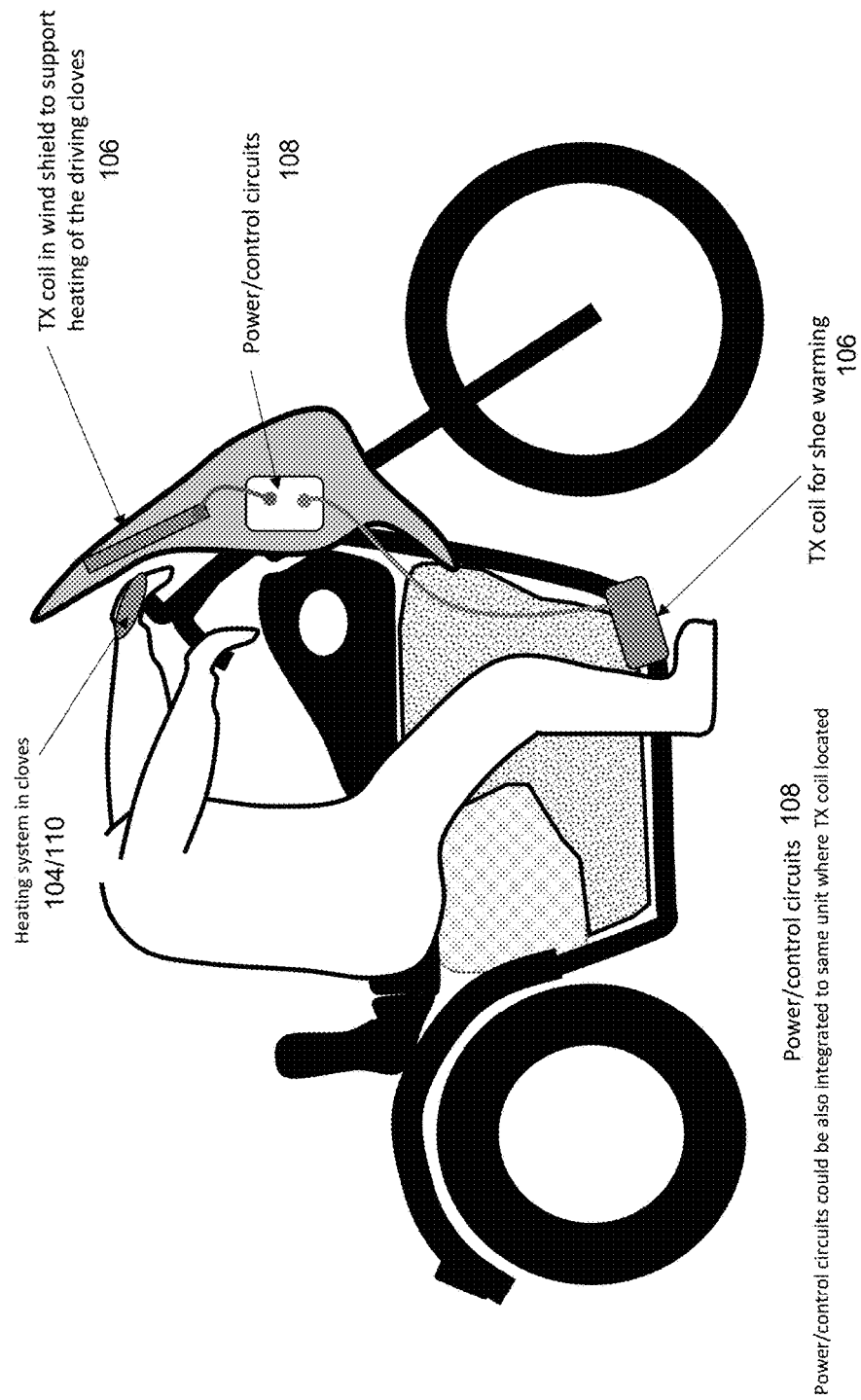

FIG. 11 illustrates an embodiment of a motorcycle (which may also be applicable in a snowmobile, a bicycle, etc.) with a windshield. As shown in FIG. 11, the transmit coil 106 may be integrated into the windshield of the motorcycle. As also illustrated, this embodiment may include a heating element 106 in the foot/leg support area (e.g., to provide an integrated shoe/boot warmer such as discussed with reference to the other figures). Also, the glove heating system 104/110 discussed with reference to FIG. 8 may be incorporated into the embodiments of FIG. 10 or 11 (only shown in FIG. 11 for the sake of simplicity).

Figure 12:
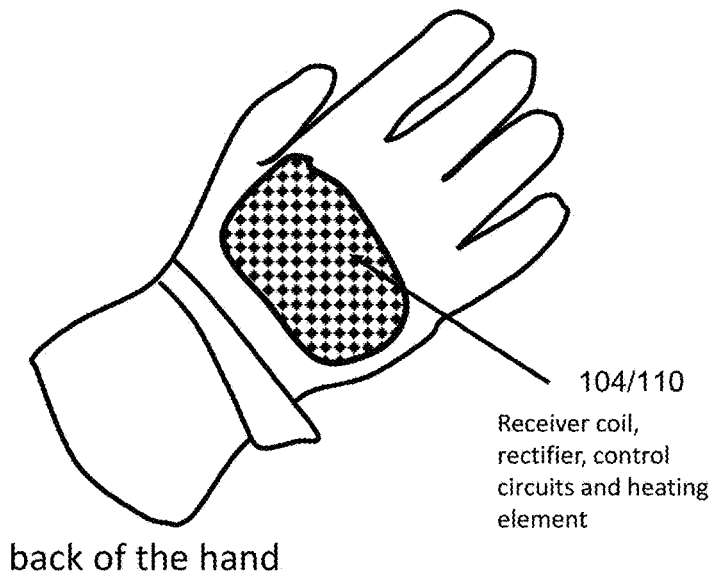

FIG. 12 illustrates an embodiment of a glove (such as those discussed herein, such as a ski glove, a motorcycle/snowmobile/bicycle glove, etc.) with an integrated heating element structure 104/110 on the backside of the glove/hand. In one embodiment, the glove of FIG. 12 may be used for the embodiments of FIGS. 8,10, and/or 11.

Figure 13:
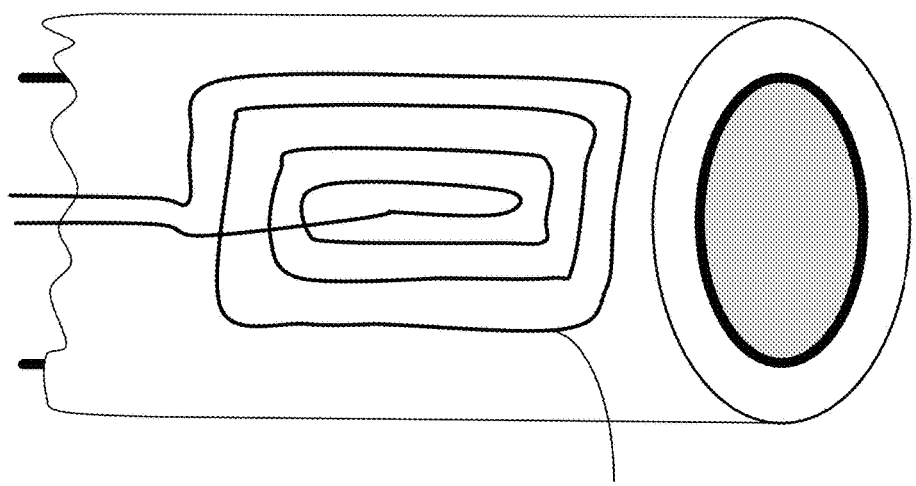

FIG. 13 illustrates an embodiment of a handlebar grip structure (which may be used for a motorcycle/snowmobile/bicycle, etc.) to support heating of gloves. As shown in FIG.

13, coil(s) and/or power/control logic 106/108 may be integrated on at least one side of the handlebar (although more than one heating element structure may be provided in various embodiments). In some embodiments, the handlebar of FIG. 13 may be used for the embodiments of FIGS. 10 and/or 11.

Figure 14:
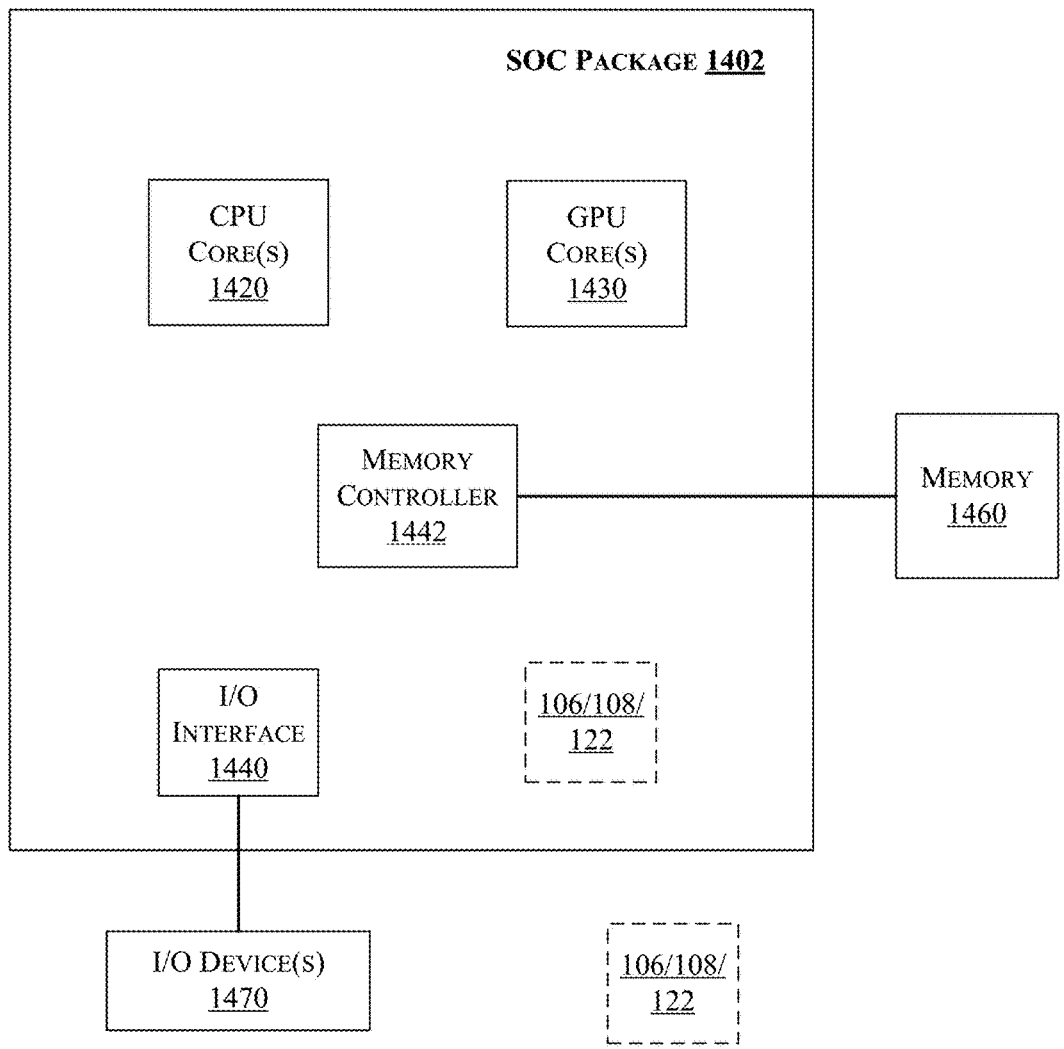
FIGS. 14 and 15 illustrate block diagrams of embodiments of computing systems, which may be utilized to implement various embodiments discussed herein.

Moreover, some embodiments may utilize one or more components utilized in computing systems that include one or more processors (e.g., with one or more processor cores), such as those discussed with reference to FIGS. 14-17, including for example mobile computing devices such as a smartphone, tablet, UMPC (Ultra-Mobile Personal Computer), laptop computer, Ultrabook™ computing device, wearable devices (such as smart watch, smart glasses, smart bracelets, and the like), etc. More particularly, in some embodiments, one or more of the components discussed herein can be embodied as a System On Chip (SOC) device. FIG. 14 illustrates a block diagram of an SOC package in accordance with an embodiment. As illustrated in FIG. 14, SOC 1402 includes one or more Central Processing Unit (CPU) cores 1420, one or more Graphics Processing Unit (GPU) cores 1430, an Input/Output (I/O) interface 1440, and a memory controller 1442. Various components of the SOC package 1402 may be coupled to an interconnect or bus such as discussed herein with reference to the other figures. Also, the SOC package 1402 may include more or less components, such as those discussed herein with reference to the other figures. Further, each component of the SOC package 1420 may include one or more other components, e.g., as discussed with reference to the other figures herein. In one embodiment, SOC package 1402 (and its components) is provided on one or more Integrated Circuit (IC) die, e.g., which are packaged into a single semiconductor device.

As illustrated in FIG. 14, SOC package 1402 is coupled to a memory 1460 (which may be similar to or the same as memory discussed herein with reference to the other figures) via the memory controller 1442. In an embodiment, the memory 1460 (or a portion of it) can be integrated on the SOC package 1402.

The I/O interface 1440 may be coupled to one or more I/O devices 1470, e.g., via an interconnect and/or bus such as discussed herein with reference to other figures. I/O device(s) 1470 may include one or more of a keyboard, a mouse, a touchpad, a display device, an image/video capture device (such as a camera or camcorder/video recorder), a touch screen, a speaker, or the like. Furthermore, SOC package 1402 may include/integrate logic 106/108 and/or sensor(s) 122 in some embodiments. Alternatively, logic 106/108 and/or sensor(s) 122 may be provided outside of the SOC package 1402 (i.e., logic 106/108 is provided as a discrete logic).

Figure 15:
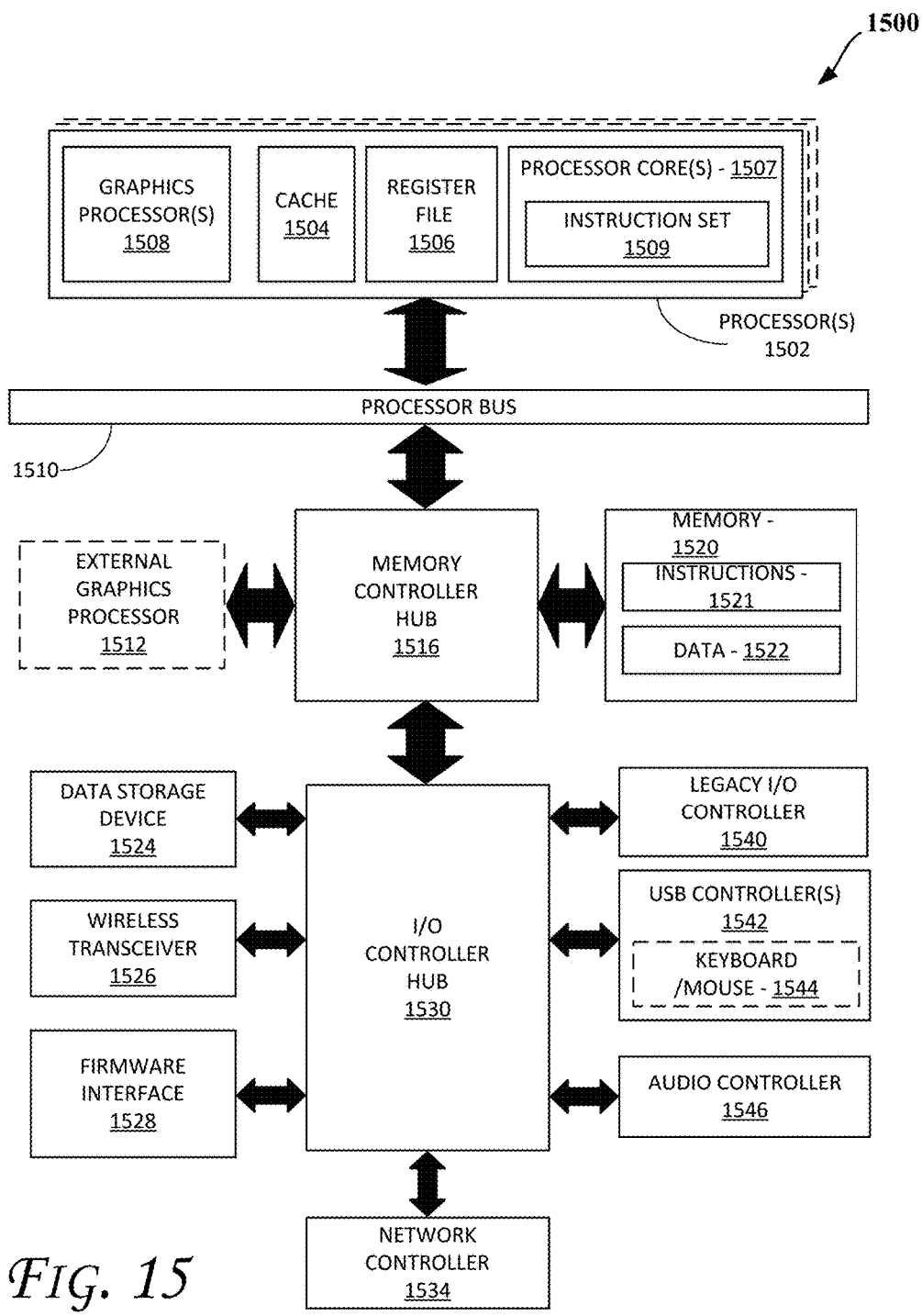

FIG. 15 is a block diagram of a processing system 1500, according to an embodiment. In various embodiments the system 1500 includes one or more processors 1502 and one or more graphics processors 1508, and may be a single processor desktop system, a multiprocessor workstation system, or a server system having a large number of processors 1502 or processor cores 1507. In on embodiment, the system 1500 is a processing platform incorporated within a system-on-a-chip (SoC) integrated circuit for use in mobile, handheld, or embedded devices.

An embodiment of system 1500 can include, or be incorporated within a server-based gaming platform, a game console, including a game and media console, a mobile gaming console, a handheld game console, or an online game console. In some embodiments system 1500 is a mobile phone, smart phone, tablet computing device or mobile Internet device. Data processing system 1500 can also include, couple with, or be integrated within a wearable device, such as a smart watch wearable device, smart eyewear device, augmented reality device, or virtual reality device. In some embodiments, data processing system 1500 is a television or set top box device having one or more processors 1502 and a graphical interface generated by one or more graphics processors 1508.

In some embodiments, the one or more processors 1502 each include one or more processor cores 1507 to process instructions which, when executed, perform operations for system and user software. In some embodiments, each of the one or more processor cores 1507 is configured to process a specific instruction set 1509. In some embodiments, instruction set 1509 may facilitate Complex Instruction Set Computing (CISC), Reduced Instruction Set Computing (RISC), or computing via a Very Long Instruction Word (VLIW). Multiple processor cores 1507 may each process a different instruction set 1509, which may include instructions to facilitate the emulation of other instruction sets. Processor core 1507 may also include other processing devices, such as a Digital Signal Processor (DSP).

In some embodiments, the processor 1502 includes cache memory 1504. Depending on the architecture, the processor 1502 can have a single internal cache or multiple levels of internal cache. In some embodiments, the cache memory is shared among various components of the processor 1502. In some embodiments, the processor 1502 also uses an external cache (e.g., a Level-3 (L3) cache or Last Level Cache (LLC)) (not shown), which may be shared among processor cores 1507 using known cache coherency techniques. A register file 1506 is additionally included in processor 1502 which may include different types of registers for storing different types of data (e.g., integer registers, floating point registers, status registers, and an instruction pointer register). Some registers may be general-purpose registers, while other registers may be specific to the design of the processor 1502.

In some embodiments, processor 1502 is coupled to a processor bus 1510 to transmit communication signals such as address, data, or control signals between processor 1502 and other components in system 1500. In one embodiment the system 1500 uses an exemplary 'hub' system architecture, including a memory controller hub 1516 and an Input Output (I/O) controller hub 1530. A memory controller hub 1516 facilitates communication between a memory device and other components of system 1500, while an I/O Controller Hub (ICH) 1530 provides connections to I/O devices via a local I/O bus. In one embodiment, the logic of the memory controller hub 1516 is integrated within the processor.

Memory device 1520 can be a dynamic random access memory (DRAM) device, a static random access memory (SRAM) device, flash memory device, phase-change memory device, or some other memory device having suitable performance to serve as process memory. In one embodiment the memory device 1520 can operate as system memory for the system 1500, to store data 1522 and instructions 1521 for use when the one or more processors 1502 executes an application or process. Memory controller hub 1516 also couples with an optional external graphics processor 1512, which may communicate with the one or more graphics processors 1508 in processors 1502 to perform graphics and media operations.

In some embodiments, ICH 1530 enables peripherals to connect to memory device 1520 and processor 1502 via a high-speed I/O bus. The I/O peripherals include, but are not limited to, an audio controller 1546, a firmware interface 1528, a wireless transceiver 1526 (e.g., Wi-Fi, Bluetooth), a data storage device 1524 (e.g., hard disk drive, flash memory, etc.), and a legacy I/O controller 1540 for coupling legacy (e.g., Personal System 2 (PS/2)) devices to the system. One or more Universal Serial Bus (USB) controllers 1542 connect input devices, such as keyboard and mouse 1544 combinations. A network controller 1534 may also couple to ICH 1530. In some embodiments, a high-performance network controller (not shown) couples to processor bus 1510. It will be appreciated that the system 1500 shown is exemplary and not limiting, as other types of data processing systems that are differently configured may also be used. For example, the I/O controller hub 1530 may be integrated within the one or more processor 1502, or the memory controller hub 1516 and I/O controller hub 1530 may be integrated into a discreet external graphics processor, such as the external graphics processor 1512.

Figure 16:
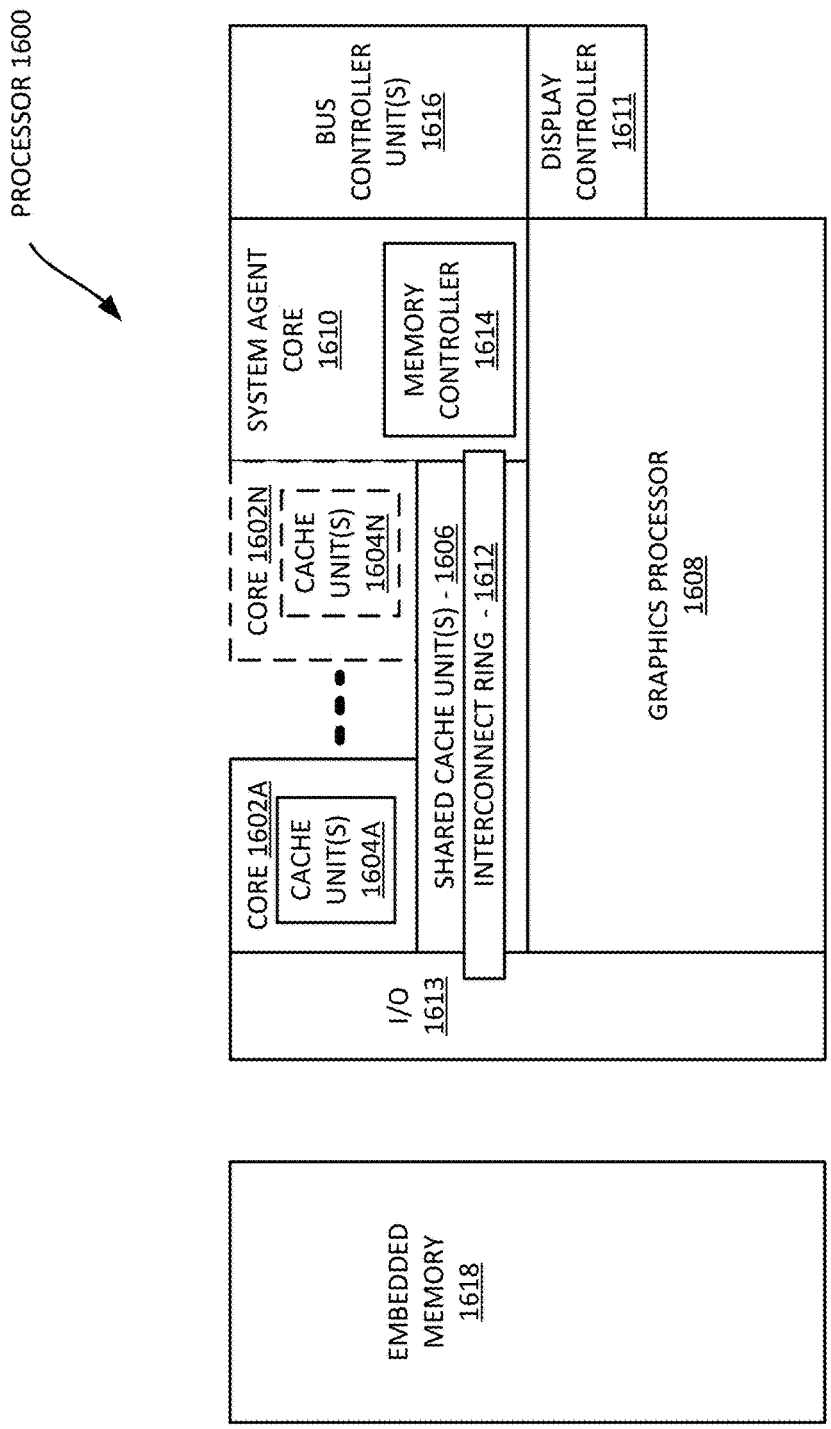
FIGS. 16 and 17 illustrate various components of processers in accordance with some embodiments.

FIG. 16 is a block diagram of an embodiment of a processor 1600 having one or more processor cores 1602A-1602N, an integrated memory controller 1614, and an integrated graphics processor 1608. Those elements of FIG. 16 having the same reference numbers (or names) as the elements of any other figure herein can operate or function in any manner similar to that described elsewhere herein, but are not limited to such. Processor 1600 can include additional cores up to and including additional core 1602N represented by the dashed lined boxes. Each of processor cores 1602A-1602N includes one or more internal cache units 1604A-1604N. In some embodiments each processor core also has access to one or more shared cached units 1606.

The internal cache units 1604A-1604N and shared cache units 1606 represent a cache memory hierarchy within the processor 1600. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1606 and 1604A-1604N.

In some embodiments, processor 1600 may also include a set of one or more bus controller units 1616 and a system agent core 1610. The one or more bus controller units 1616 manage a set of peripheral buses, such as one or more Peripheral Component Interconnect buses (e.g., PCI, PCI Express). System agent core 1610 provides management functionality for the various processor components. In some embodiments, system agent core 1610 includes one or more integrated memory controllers 1614 to manage access to various external memory devices (not shown).

In some embodiments, one or more of the processor cores 1602A-1602N include support for simultaneous multi-threading. In such embodiment, the system agent core 1610 includes components for coordinating and operating cores 1602A-1602N during multi-threaded processing. System agent core 1610 may additionally include a power control unit (PCU), which includes logic and components to regulate the power state of processor cores 1602A-1602N and graphics processor 1608.

In some embodiments, processor 1600 additionally includes graphics processor 1608 to execute graphics processing operations. In some embodiments, the graphics processor 1608 couples with the set of shared cache units 1606, and the system agent core 1610, including the one or more integrated memory controllers 1614. In some embodiments, a display controller 1611 is coupled with the graphics processor 1608 to drive graphics processor output to one or more coupled displays. In some embodiments, display controller 1611 may be a separate module coupled with the graphics processor via at least one interconnect, or may be integrated within the graphics processor 1608 or system agent core 1610.

In some embodiments, a ring based interconnect unit 1612 is used to couple the internal components of the processor 1600. However, an alternative interconnect unit may be used, such as a point-to-point interconnect, a switched interconnect, or other techniques, including techniques well known in the art. In some embodiments, graphics processor 1608 couples with the ring interconnect 1612 via an I/O link 1613.

The exemplary I/O link 1613 represents at least one of multiple varieties of I/O interconnects, including an on package I/O interconnect which facilitates communication between various processor components and a high-performance embedded memory module 1618, such as an eDRAM (or embedded DRAM) module. In some embodiments, each of the processor cores 1602-1602N and graphics processor 1608 use embedded memory modules 1618 as a shared Last Level Cache.

In some embodiments, processor cores 1602A-1602N are homogenous cores executing the same instruction set architecture. In another embodiment, processor cores 1602A-1602N are heterogeneous in terms of instruction set architecture (ISA), where one or more of processor cores 1602A-1602N execute a first instruction set, while at least one of the other cores executes a subset of the first instruction set or a different instruction set. In one embodiment processor cores 1602A-1602N are heterogeneous in terms of microarchitecture, where one or more cores having a relatively higher power consumption couple with one or more power cores having a lower power consumption. Additionally, processor 1600 can be implemented on one or more chips or as an SoC integrated circuit having the illustrated components, in addition to other components.

Figure 17:
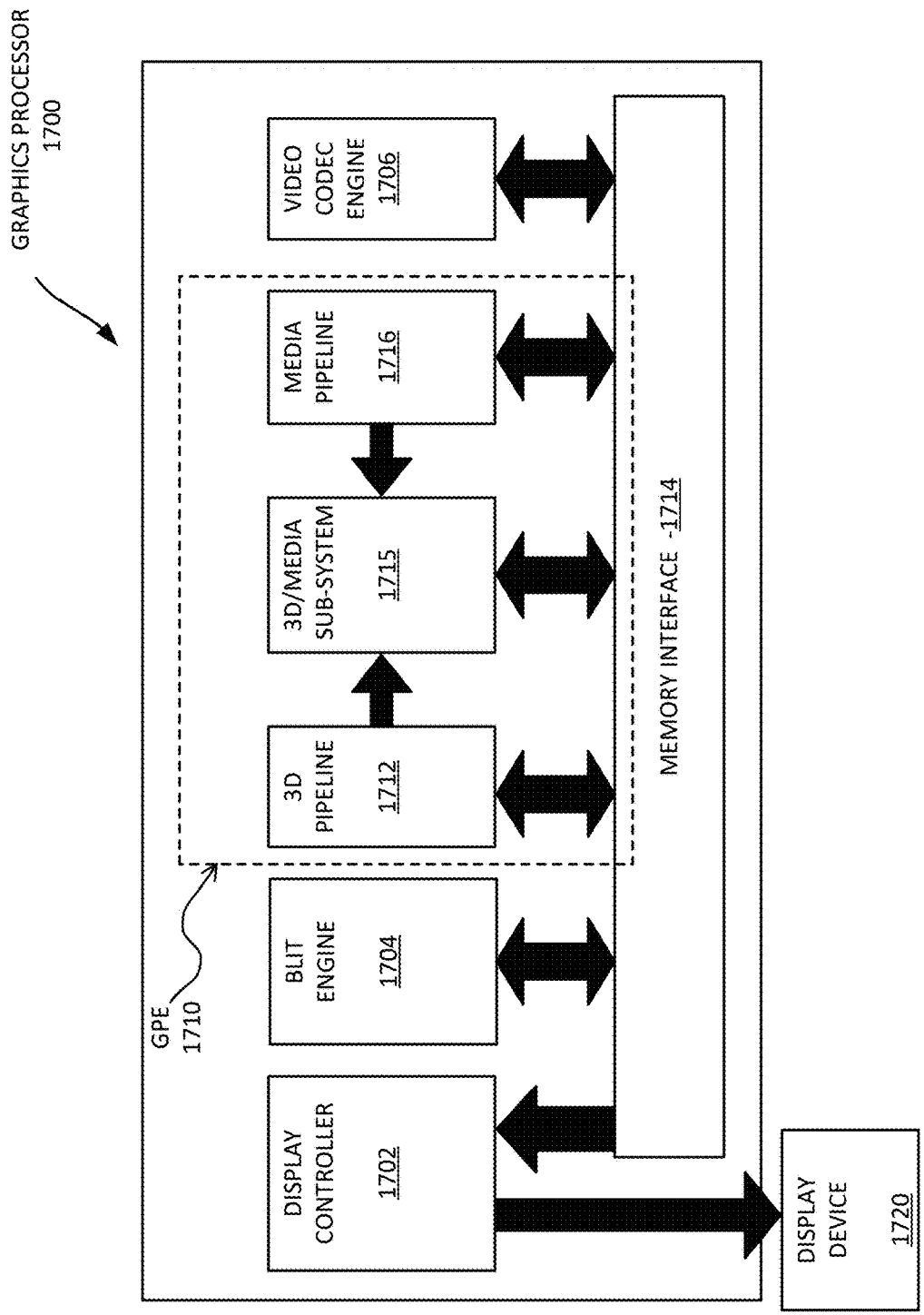

FIG. 17 is a block diagram of a graphics processor 1700, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1700 includes a memory interface 1714 to access memory. Memory interface 1714 can be an interface to local memory, one or more internal caches, one or more shared external caches, and/or to system memory.

In some embodiments, graphics processor 1700 also includes a display controller 1702 to drive display output data to a display device 1720. Display controller 1702 includes hardware for one or more overlay planes for the display and composition of multiple layers of video or user interface elements. In some embodiments, graphics processor 1700 includes a video codec engine 1706 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1700 includes a block image transfer (BLIT) engine 1704 to perform two-dimensional (2D) rasterizer operations including, for example, bit-boundary block transfers. However, in one embodiment, 17D graphics operations are performed using one or more components of graphics processing engine (GPE) 1710. In some embodiments, graphics processing engine 1710 is a compute engine for performing graphics operations, including three-dimensional (3D) graphics operations and media operations.

In some embodiments, GPE 1710 includes a 3D pipeline 1712 for performing 3D operations, such as rendering three-dimensional images and scenes using processing functions that act upon 3D primitive shapes (e.g., rectangle, triangle, etc.). The 3D pipeline 1712 includes programmable and fixed function elements that perform various tasks within the element and/or spawn execution threads to a 3D/Media sub-system 1715. While 3D pipeline 1712 can be used to perform media operations, an embodiment of GPE 1710 also includes a media pipeline 1716 that is specifically used to perform media operations, such as video post-processing and image enhancement.

In some embodiments, media pipeline 1716 includes fixed function or programmable logic units to perform one or more specialized media operations, such as video decode acceleration, video de-interlacing, and video encode acceleration in place of, or on behalf of video codec engine 1706. In some embodiments, media pipeline 1716 additionally includes a thread spawning unit to spawn threads for execution on 3D/Media sub-system 1715. The spawned threads perform computations for the media operations on one or more graphics execution units included in 3D/Media sub-system 1715.

In some embodiments, 3D/Media subsystem 1715 includes logic for executing threads spawned by 3D pipeline 1712 and media pipeline 1716. In one embodiment, the pipelines send thread execution requests to 3D/Media sub-system 1715, which includes thread dispatch logic for arbitrating and dispatching the various requests to available thread execution resources. The execution resources include an array of graphics execution units to process the 3D and media threads. In some embodiments, 3D/Media subsystem 1715 includes one or more internal caches for thread instructions and data. In some embodiments, the subsystem also includes shared memory, including registers and addressable memory, to share data between threads and to store output data.

Moreover, the scenes, images, or frames discussed herein (e.g., which may be processed by the graphics logic in various embodiments) may be captured by an image capture device (such as a digital camera (that may be embedded in another device such as a smart phone, a tablet, a laptop, a stand-alone camera, etc.) or an analog device whose captured images are subsequently converted to digital form). Moreover, the image capture device may be capable of capturing multiple frames in an embodiment. Further, one or more of the frames in the scene are designed/generated on a computer in some embodiments. Also, one or more of the frames of the scene may be presented via a display (such as the display discussed with reference to FIGS. 7 and/or 8, including for example a flat panel display device, etc.).

The following examples pertain to further embodiments. Example 1 includes an apparatus comprising: logic, the logic at least partially comprising hardware logic, to control provision of power to one or more wireless power transmitter coils based at least in part on one or more signals, wherein the one or more wireless power transmitter coils are to transmit electromagnetic energy to a heating element of an article of clothing proximate to the one or more wireless power transmitter coils. Example 2 includes the apparatus of example 1, wherein the heating element is to be constructed of a plurality of layers or a mixture of a plurality of material. Example 3 includes the apparatus of example 2, wherein the plurality of layers are to comprise at least two of: a heat spreading layer, a heating element layer, a shielding layer, a Ferrite sheet layer, a receiver coil layer, or a heating element layer with shielding properties. Example 4 includes the apparatus of example 1, wherein the one or more signals are to correspond to sensor data, wherein the sensor data is to comprise one or more temperature values, wherein the one or more temperature values are to be detected by one or more sensors that are to detect an ambient temperature or a temperature of the article of clothing. Example 5 includes the apparatus of example 1, wherein the one or more signals are to correspond to proximity information, wherein the proximity information is to be determined based at least in part on one or more of: sensor data or wirelessly transmitted data. Example 6 includes the apparatus of example 5, wherein the proximity information is to indicate proximity of the article of clothing to the logic, the one or more wireless power transmitter coils, or a computing device that includes the logic. Example 7 includes the apparatus of example 5, comprising logic to allow or deny access to an item based at least in part on the proximity information. Example 8 includes the apparatus of example 7, wherein the item is to be selected from a group comprising: a lock, a car, a bus, a bicycle, a bus, a motorcycle, a house, or an office. Example 9 includes the apparatus of example 1, wherein a portable computing device is to comprise the logic. Example 10 includes the apparatus of example 9, wherein the portable computing device is to comprise one or more of: a System On Chip (SOC) device; a processor, having one or more processor cores; a flat panel display device, and memory. Example 11 includes the apparatus of example 1, comprising logic to transmit a warning signal in response to a determination that the article of clothing has a temperature value that is above a threshold temperature value. Example 12 includes the apparatus of example 1, wherein one or more of the logic, a processor having one or more processor cores, one or more sensors, and memory are on a single integrated circuit die.

Example 13 includes an article of clothing comprising: a heating element to receive electromagnetic energy from one or more wireless power transmitter coils based at least in part on one or more signals, wherein the heating element is to be constructed of a plurality of layers. Example 14 includes the article of clothing of example 13, wherein the plurality of layers are to comprise at least two of: a heat spreading layer, a heating element layer, a shielding layer, a Ferrite sheet layer, a receiver coil layer, or a heating element layer with shielding properties. Example 15 includes the article of clothing of example 13, wherein the one or more signals are to correspond to sensor data, wherein the sensor data is to comprise one or more temperature values, wherein the one or more temperature values are to be detected by one or more sensors that are to detect an ambient temperature or a temperature of the heating element. Example 16 includes the article of clothing of example 13, further comprising a receiver coil proximate to the one or more wireless power transmitter coils. Example 17 includes the article of clothing of example 16, wherein the receiver coil is to be coupled to a rectifier or control logic. Example 18 includes the article of clothing of example 13, wherein a magnetic coupling is to be established to maintain a distance between the article of clothing and the one or more wireless power transmitter coils. Example 19 includes the article of clothing of example 13, further comprising one or more sensors or one or more wireless interfaces to generate at least one of the one or more signals. Example 20 includes the article of clothing of example 19, wherein the one or more sensors are to transmit the at least one of the one or more temperature values to control logic coupled to the one or more wireless power transmitter coils. Example 21 includes the article of clothing of example 19, wherein the control logic is to control provision of power to the one or more wireless power transmitter coils based at least in part on the one or more temperature values. Example 22 includes the article of clothing of example 13, wherein the one or more signals are to correspond to proximity information, wherein the proximity information is to be determined based at least in part on one or more of: sensor data or wirelessly transmitted data. Example 23 includes the article of clothing of example 13, comprising logic to transmit a warning signal in response to a determination that the article of clothing has a temperature value that is above a threshold temperature value. Example 24 includes the article of clothing of example 13, comprising logic to cause the article of clothing to be heated at a first temperature value in response to a determination that the article of clothing is not being worn, wherein the first temperature value is higher than a second temperature value, wherein the second temperature value is to correspond to a target heating temperature for the article of clothing when the article of clothing is worn. Example 25 includes the article of clothing of example 13, wherein the article of clothing is to be selected from a group comprising: a shoe, a boot, a hat, a helmet, a sock, a glove, an ear muff, a shirt, a jacket, a scarf, a pair of pants, a body protector, a safety vest, or underwear.

Example 26 includes a method comprising: controlling provision of power to one or more wireless power transmitter coils based at least in part on one or more signals, wherein the one or more wireless power transmitter coils transmit electromagnetic energy to a heating element of an article of clothing proximate to the one or more wireless power transmitter coils. Example 27 includes the method of example 26, further comprising one or more sensors detecting an ambient temperature or a temperature of the article of clothing. Example 28 includes the method of example 26, further comprising determining proximity information based at least in part on one or more of: sensor data or wirelessly transmitted data. Example 29 includes the method of example 28, further comprising allowing or denying access to an item based at least in part on the proximity information. Example 30 includes the method of example 26, further comprising transmitting a warning signal in response to a determination that the article of clothing has a temperature value that is above a threshold temperature value.

Example 31 includes an apparatus comprising means to perform a method as set forth in any preceding example. Example 32 comprises machine-readable storage including machine-readable instructions, when executed, to implement a method or realize an apparatus as set forth in any preceding example.

In various embodiments, the operations discussed herein, e.g., with reference to FIGS. 1A-17, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1A-17.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic, the logic at least partially comprising hardware logic, to control provision of power to one or more wireless power transmitter coils based at least in part on one or more signals,
   wherein the one or more wireless power transmitter coils are to transmit electromagnetic energy to a heating element of an article of clothing proximate to the one or more wireless power transmitter coils, and
   wherein the logic is to cause the article of clothing to be heated at a first temperature value in response to a determination that the article of clothing is being worn, and
   wherein the logic is to cause the article of clothing to be heated at a second temperature value in response to a determination that the article of clothing is not being worn.

2. The apparatus of claim 1, wherein the heating element is to be constructed of a plurality of layers or a mixture of a plurality of material.

3. The apparatus of claim 2, wherein the plurality of layers are to comprise at least two of: a heat spreading layer, a heating element layer, a shielding layer, a Ferrite sheet layer, a receiver coil layer, or a heating element layer with shielding properties.

4. The apparatus of claim 1, wherein the one or more signals are to correspond to sensor data, wherein the sensor data is to comprise one or more temperature values, wherein the one or more temperature values are to be detected by one or more sensors that are to detect an ambient temperature or a temperature of the article of clothing.

5. The apparatus of claim 1, wherein the one or more signals are to correspond to proximity information, wherein the proximity information is to be determined based at least in part on one or more of: sensor data or wirelessly transmitted data.

6. The apparatus of claim 5, wherein the proximity information is to indicate proximity of the article of clothing to the logic, the one or more wireless power transmitter coils, or a computing device that includes the logic.

7. The apparatus of claim 5, comprising logic to allow or deny access to an item based at least in part on the proximity information.

8. The apparatus of claim 7, wherein the item is to be selected from a group comprising: a lock, a car, a bus, a bicycle, a bus, a motorcycle, a house, or an office.

9. The apparatus of claim 1, wherein a portable computing device is to comprise the logic.

10. The apparatus of claim 9, wherein the portable computing device is to comprise one or more of: a System On Chip (SOC) device; a processor, having one or more processor cores; a flat panel display device, and memory.

11. The apparatus of claim 1, comprising logic to transmit a warning signal in response to a determination that the article of clothing has a temperature value that is above a threshold temperature value.

12. The apparatus of claim 1, wherein one or more of the logic, a processor having one or more processor cores, one or more sensors, and memory are on a single integrated circuit die.

13. An article of clothing comprising:
a heating element to receive electromagnetic energy from one or more wireless power transmitter coils based at least in part on one or more signals,
wherein a magnetic coupling is to maintain a distance between the article of clothing and the one or more wireless power transmitter coils.

14. The article of clothing of claim 13, wherein the heating element comprises a plurality of layers having at least two of: a heat spreading layer, a heating element layer, a shielding layer, a Ferrite sheet layer, a receiver coil layer, or a heating element layer with shielding properties.

15. The article of clothing of claim 13, wherein the one or more signals are to correspond to sensor data, wherein the sensor data is to comprise one or more temperature values, wherein the one or more temperature values are to be detected by one or more sensors that are to detect an ambient temperature or a temperature of the heating element.

16. The article of clothing of claim 13, further comprising a receiver coil proximate to the one or more wireless power transmitter coils.

17. The article of clothing of claim 16, wherein the receiver coil is to be coupled to a rectifier or control logic.

18. The article of clothing of claim 13, further comprising one or more sensors or one or more wireless interfaces to generate at least one of the one or more signals.

19. The article of clothing of claim 18, wherein the one or more sensors are to transmit the at least one of the one or more temperature values to control logic coupled to the one or more wireless power transmitter coils.

20. The article of clothing of claim 18, wherein the control logic is to control provision of power to the one or more wireless power transmitter coils based at least in part on the one or more temperature values.

21. The article of clothing of claim 13, wherein the one or more signals are to correspond to proximity information, wherein the proximity information is to be determined based at least in part on one or more of: sensor data or wirelessly transmitted data.

22. The article of clothing of claim 13, comprising logic to transmit a warning signal in response to a determination that the article of clothing has a temperature value that is above a threshold temperature value.

23. The article of clothing of claim 13, comprising logic to cause the article of clothing to be heated at a first temperature value in response to a determination that the article of clothing is not being worn, wherein the first temperature value is higher than a second temperature value, wherein the second temperature value is to correspond to a target heating temperature for the article of clothing when the article of clothing is worn.

24. The article of clothing of claim 13, wherein the article of clothing is to be selected from a group comprising: a shoe, a boot, a hat, a helmet, a sock, a glove, an ear muff, a shirt, a jacket, a scarf, a pair of pants, a body protector, a safety vest, or underwear.

* * * * *